United States Patent
Olsson

(10) Patent No.: US 10,574,507 B2
(45) Date of Patent: Feb. 25, 2020

(54) METHOD AND NODE FOR HANDLING CONTROL PLANE SIGNALING

(71) Applicant: Telefonaktiebolaget LM Ericsson (publ), Stockholm (SE)

(72) Inventor: Lasse Olsson, Stora Höga (SE)

(73) Assignee: Telefonaktiebolaget LM Ericsson (Publ) (SE)

( * ) Notice: Subject to any disclaimer, the term of this patent is extended or adjusted under 35 U.S.C. 154(b) by 0 days.

(21) Appl. No.: 15/533,513

(22) PCT Filed: Dec. 12, 2014

(86) PCT No.: PCT/EP2014/077560
§ 371 (c)(1),
(2) Date: Jun. 6, 2017

(87) PCT Pub. No.: WO2016/091322
PCT Pub. Date: Jun. 16, 2016

(65) Prior Publication Data
US 2017/0331671 A1   Nov. 16, 2017

(51) Int. Cl.
*G06F 13/00* (2006.01)
*H04L 12/24* (2006.01)
(Continued)

(52) U.S. Cl.
CPC ............. *H04L 41/04* (2013.01); *H04W 76/12* (2018.02); *H04L 41/0893* (2013.01);
(Continued)

(58) Field of Classification Search
CPC . H04L 41/04; H04L 41/0893; H04L 47/2416; H04W 76/12; H04W 88/16; H04W 92/02; H04W 28/0247
(Continued)

(56) References Cited

U.S. PATENT DOCUMENTS 8,867,361 B2 * 10/2014 Kempf ................. H04W 24/02
370/236
8,873,398 B2 * 10/2014 Kempf ................. H04W 24/02
370/236
(Continued)

FOREIGN PATENT DOCUMENTS

CN    103548376 A    1/2014
CN    104205055 A    12/2014
(Continued)

OTHER PUBLICATIONS

International Search Report and Written Opinion dated Sep. 2, 2015 for International Application Serial No. PCT/EP2014/077560, International Filing Date: Dec. 12, 2014 consisting of 12-pages.
(Continued)

*Primary Examiner* — Kenneth R Coulter
(74) *Attorney, Agent, or Firm* — Christopher & Weisberg, P.A.

(57) ABSTRACT

The embodiments herein relate to a method performed by a control plane Evolved Packet Core, cEPC, node for handling control plane signaling in a communications system. The cEPC node handles substantially all control plane signaling for a User Equipment, UE, between a Radio Access Network, RAN, node and an operator network.

27 Claims, 26 Drawing Sheets

(51) Int. Cl.
*H04W 76/12* (2018.01)
*H04L 12/853* (2013.01)
*H04W 28/02* (2009.01)
*H04W 88/16* (2009.01)
*H04W 92/02* (2009.01)

(52) U.S. Cl.
CPC ..... *H04L 47/2416* (2013.01); *H04W 28/0247* (2013.01); *H04W 88/16* (2013.01); *H04W 92/02* (2013.01)

(58) Field of Classification Search
USPC .......................... 709/220–222, 203, 227–229
See application file for complete search history.

(56) References Cited

U.S. PATENT DOCUMENTS

| | | | |
|---|---|---|---|
| 9,497,661 B2 * | 11/2016 | Kempf | H04W 24/02 |
| 2012/0300615 A1 * | 11/2012 | Kempf | H04W 24/02 370/216 |
| 2012/0303835 A1 * | 11/2012 | Kempf | H04W 24/02 709/235 |
| 2013/0185419 A1 | 7/2013 | Zhang et al. | |
| 2015/0071053 A1 * | 3/2015 | Kempf | H04W 24/02 370/216 |

FOREIGN PATENT DOCUMENTS

| | | |
|---|---|---|
| WO | 2012160465 A1 | 11/2012 |
| WO | 2013030693 A1 | 3/2013 |
| WO | 2013124783 A1 | 8/2013 |
| WO | 2013143611 A1 | 10/2013 |
| WO | 2013144747 A1 | 10/2013 |
| WO | 2014085207 A1 | 6/2014 |
| WO | 2014131462 A | 9/2014 |
| WO | 2014169470 A1 | 10/2014 |

OTHER PUBLICATIONS

Kostas Pentikousis, et al., MobileFlow: Toward Software-Defined Mobile Networks. Published in: IEEE Communications Magazine. vol. 51(7):44-53, Jul. 2013 consisting of 10-pages.

Siwar Ben Hadj Said, et al.. "New Control Plane in 3GPP LTE/EPC Architecture for On-Demand Connectivity Service," Published in: 2nd IEEE International Conference on Cloud Networking, CLOUDNET 2013: Conference Location and Date: San Francisco, United States, Nov. 11-13, 2013, consisting of 5-pages.

Van-Giang Nguyen and Younghan Kim, "Signaling Load Analysis in Openflow-Enabled LTE/EPC Architecture," Published in: 2014 International Conference on Information and Communication Technology Convergence (ICTC), pp. 734-735, Conference Location and Date: Busan, South Korea, Oct. 22-24, 2014 consisting of 2-pages.

Chinese Office Action and English Translation dated Jul. 29, 2019 for Application No. 201480083932.5, Consisting of 10-pages.

"Adax partners with 321 Action to boost LTE network performance", Adax, Inc. Feb. 17, 2014, Consisting of 1-page.

Atkinson, James; LTE Core in a Box, published May 19, 2014 in Wireless Communications, Consisting of 2-pages.

3GPP TS 23.401 V12.4.0; Mar. 10, 2014; "3rd Generation Partnership Project General Packet Radio Service (GPRS) enhancements for Evolved Universal Terrestrial Radio Access Network (E-UTRAN) access".

* cited by examiner

METHOD AND NODE FOR HANDLING CONTROL PLANE SIGNALING

CROSS-REFERENCE TO RELATED APPLICATIONS

This application is a Submission Under 35 U.S.C. § 371 for U.S. National Stage Patent Application of International Application Number: PCT/EP2014/077560, filed Dec. 12, 2014 entitled "A METHOD AND NODE FOR HANDLING CONTROL PLANE SIGNALING," the entirety of which is incorporated herein by reference.

TECHNICAL FIELD

Embodiments herein relate generally to a control plane Evolved Packet Core (cEPC) node and a method in the cEPC node. More particularly the embodiments herein relate to handling control plane signalling in a communications system.

BACKGROUND

In communications systems, there are a lot of "internal" interfaces between the different Evolved Packet Core (EPC) nodes such as e.g. the Serving General packet radio service Support Node (SGSN), the Mobility Management Entity (MME), the Gateway General packet radio service Support Node (GGSN), the Serving GateWay (SGW), the Packet data network GateWay (PGW) and the Policy and Charging Rules Function (PCRF). The interfaces between these nodes may be referred to as control plane interfaces and they exist in order to e.g. handle the communication between the different nodes.

Some examples of control plane interfaces are:
S3 (between the SGSN and the MME).
S4 (between the SGSN and the SGW).
S5 (between the SGW and the PGW).
S11 (between the SGW and the PGW).
Gn (between the SGSN and the GGSN (excluding the SGSN-SGSN communication)).
Gx (between the PGW and the PCRF).

These example interfaces may create an example architecture of a communications system 100 as illustrated in FIG. 1. In more detail, FIG. 1 illustrates an exemplary embodiment of a non-roaming architecture for Third Partnership Project (3GPP) access. FIG. 1 shows a User Equipment (UE) 101 served by a Radio Access Network (RAN) node in an E-UTRAN 103. E-UTRAN is short for Evolved-Universal Terrestrial Radio Access Network. The RAN node may be for example a base station, a NodeB, an evolved NodeB (eNode B, eNB), Radio Network Controller (RNC) or any other element capable to communicate with the UE 101. The interface between the UE 101 and the E-UTRAN 103 may be referred to as LTE-Uu.

An MME 108 may be connected to the E-UTRAN 103 via the S1-MME interface. The MME 108 is a Core Network (CN) node having functions such as e.g. Non-Access Stratum (NAS) signalling, Inter CN node signalling for mobility between 3GPP access networks, UE reachability, Tracking Area (TA) list management, PGW and SGW selection, MME selection for handover with MME change etc. S10 is the interface between MMEs 108 for MME relocation and MME to MME information transfer.

Two gateway nodes are seen in FIG. 1, i.e. the SGW 110 and the PGW 115. The SGW 110 and the PGW 115 may be implemented in one physical node or in separate physical nodes. The SGW 110 is the gateway which terminates the interface towards E-UTRAN 103. The interface between the SGW 110 and the E-UTRAN 103 for the per bearer user plane tunneling and inter eNodeB path switching during handover may be referred to as S1-U. The SGW 110 routes and forwards user data packets, while also acting as the mobility anchor for the user plane during inter-eNodeB handovers etc. S11 is the interface between the SGW 110 and the MME 108.

The PGW 115 is the gateway which terminates the SGi interface towards the Packet Data Network (PDN). The PDN is illustrated in FIG. 1 by the Operator's IP Services (e.g. IMS, PSS etc.) 118. IP is short for Internet Protocol, IMS is short for IP Multimedia Subsystem or IM Multimedia core network Subsystem and PSS is short for Packet Switched Streaming. If the UE 101 is accessing multiple PDNs, there may be more than one PGW 115 for that UE 101. Functions of the PGW 115 are e.g. providing connectivity from the UE 101 to external PDNs by being the point of exit and entry of traffic for the UE 101, performing policy enforcement, packet filtering for each user, charging support, lawful interception and packet screening etc. S5 is the interface which provides user plane tunnelling and tunnel management between the SGW 110 and the PGW 115.

The SGSN 120 is responsible for the delivery of data packets to and from the UE's 101 within its geographical service area. One of the SGSN's 120 functions is to provide signaling for mobility between Second Generation/Third Generation (2G/3G) and E-UTRAN 3GPP access networks. 2G/3G access network are exemplified with GERAN 122 and UTRAN 125 in FIG. 1. GERAN is short for GSM EDGE Radio Access Network, GSM is short for Global System for Mobile Communications, EDGE is short for Enhanced Data rates for GSM Evolution and UTRAN is short for Universal Terrestrial Radio Access Network. Some further functions of the SGSN 120 are to handle packet routing and transfer, mobility management (attach/detach and location management), logical link management, and authentication and charging functions etc. S3 is the interface between the SGSN 120 and the MME 108. S4 is the reference between the SGSN 120 and the SGW 110. S12 is the interface between the SGW 110 and the UTRAN 125. In some embodiments, the SGSN 120 and the MME 108 are co-located in one node. In this text, the term MME/SGSN will refer to any one of a standalone MME 108 or a standalone SGSN 120 or a combined MME 108 and SGSN 120 node.

The Home Subscriber Server (HSS) 128 is a subscriber server node similar to the GSM Home Location Register (HLR) and Authentication Centre (AuC). The HSS 128 comprises subscriber-related information (subscriber profiles), performs authentication and authorization of the user, and may provide information about the subscriber's location and IP information. The interface S6a enables transfer of subscription and authentication data for authenticating/authorizing user access to the evolved system between the MME 108 and the HSS 128.

The PCRF 130 is a policy and charging control element node. The PCRF 130 encompasses policy control decision and flow based charging control functionalities, it provides network control regarding the service data flow detection, gating, Quality of Service (QoS) and flow based charging etc. The PCRF 130 may be described as a functional entity which may be a standalone node or a function implemented in another node. The interface Gx provides transfer of (e.g.

QoS) policy and charging rules from the PCRF 130 to e.g. a Policy and Charging Enforcement Function (PCEF) in the PGW 115.

Rx is the interface between the PCRF 130 and the Operator's IP Services 118. The Rx interface is used to exchange application level session information between the PCRF 130 and the Application Function (AF) (not shown).

In some embodiments, a communications system may be divided into a radio access network and a core network. The radio access network may be e.g. the E-UTRAN 103 and may comprise a RAN node such as e.g. the base station as described above. Using the exemplary embodiment in FIG. 1, the core network may comprise for example the MME 108, the SGW 110, the PGW 115, the SGSN 120, the HSS 128 and the PCRF 130. The radio access network and the core network may each comprises additional entities not shown in FIG. 1. The core network may be a Packet Switched (PS) core network or a Circuit Switched (CS) core network.

It should be noted that the communication links between the nodes in the communications systems seen in FIG. 1 may be of any suitable kind including either a wired or wireless link. The link may use any suitable protocol depending on type and level of layer (e.g. as indicated by the Open Systems Interconnection (OSI) model) as understood by the person skilled in the art.

Payload may run through at least one of the following nodes:
SGSN 120
GGSN
SGW 110
PGW 115

Virtualization or Network Functions Virtualization (NFV) is used to separate SoftWare (SW) from HardWare (HW). NFV involves implementing network functions in software that may run on a range of standard hardware and that may be moved to various locations in the network without the need to install new equipment. The NFV is complementary to Software Defined Networking (SDN). SDN allows network administrators to manage network services through abstraction of lower level functionality.

SUMMARY

An objective of embodiments herein is therefore to obviate at least one of the above disadvantages and to provide improved signaling in a communications system.

According to a first aspect, the objective is achieved by a method performed by a cEPC node for handling control plane signaling in a communications system. The cEPC node handles substantially all or all control plane signaling for the UE between a RAN node and an operator network.

According to a second aspect, the objective is achieved by a cEPC node for handling control plane signaling in a communications system. The cEPC node is configured to handle substantially all or all control plane signaling for a UE between a RAN node and an operator network.

Thanks to that the cEPC node handles substantially all or all control plane signalling for the UE, the signalling in the communications system is improved.

Embodiments herein afford many advantages, of which a non-exhaustive list of examples follows:

An advantage of the embodiments herein is that they enable a shorter Time To Market (TTM) for other new solutions, new services and solutions platforms. With the embodiments herein, inter-vendor verification may be excluded and full accountability may be directed to one vendor on an end-to-end solution level. Furthermore, the embodiments herein provide an advantage of reducing Operational EXpenditure (OPEX) and Capital EXpenditures (CAPEX). Another advantage of the embodiments herein is that they may minimize node dependencies and improve the quality. Since the embodiments herein comprise less elements compared to the current technology, an advantage of the embodiments herein is that they have a reduced maintenance cost and simplified Operations and Maintenance (O&M) handling. An advantage of the embodiments herein seen from a network point of view is that they improve the signal capacity since fewer resources are needed as possible overcommissioning of resources only happens in one instance instead of several network elements.

The embodiments herein provide the advantage of increased flexibility in network resource usage and improved network quality and robustness. The embodiments herein improve the network signaling performance and have a reduced signaling latency.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which.

The drawings are not necessarily to scale and the dimensions of certain features may have been exaggerated for the sake of clarity. Emphasis is instead placed upon illustrating the principle of the embodiments herein.

DETAILED DESCRIPTION

Figure 2A:
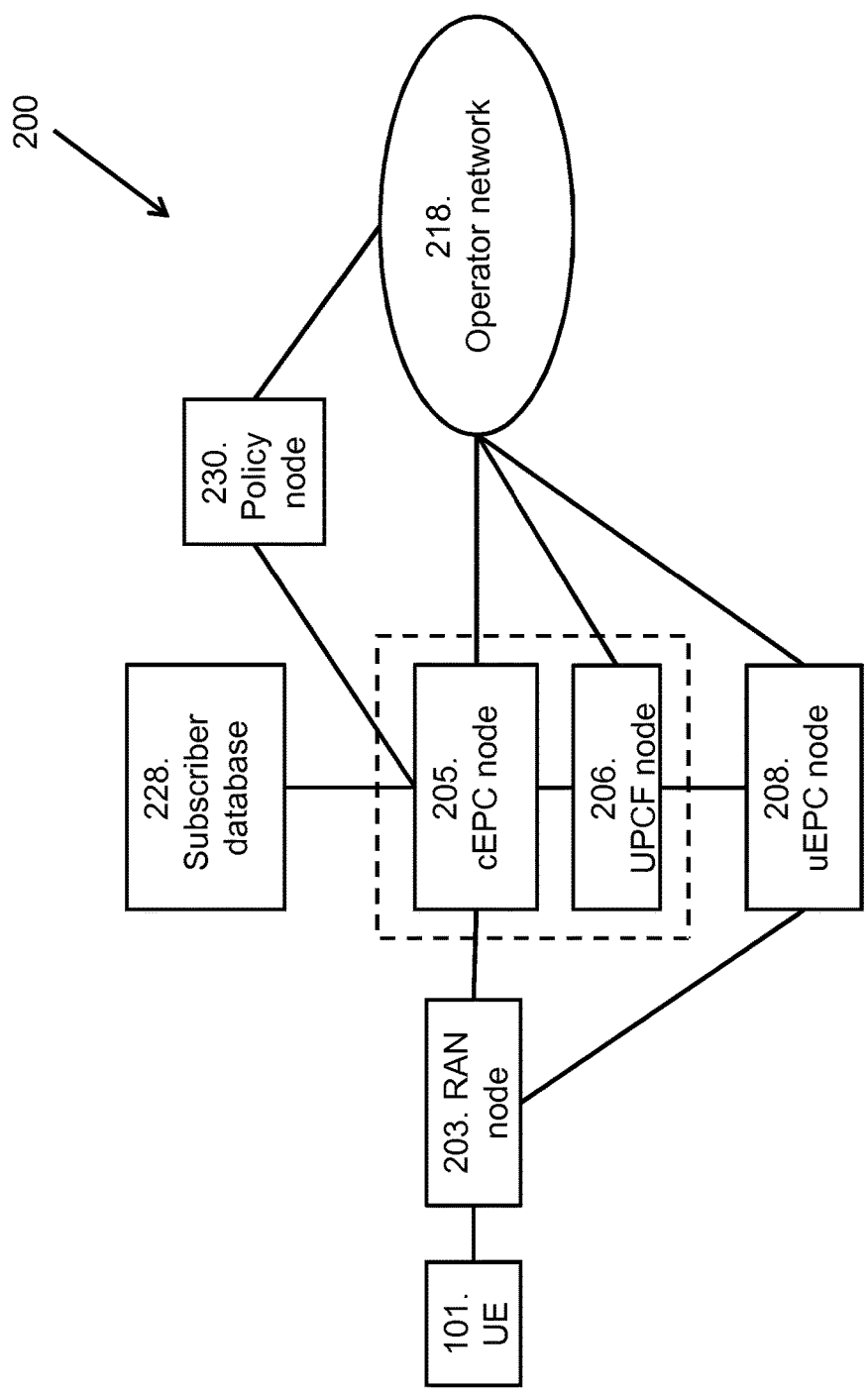
FIG. 2a is a schematic block diagram illustrating embodiments of a communications system.

FIG. 2a depicts a communications system 200 in which embodiments herein may be implemented. The communications system 200 may in some embodiments apply to one or more radio access technologies such as for example Long Term Evolution (LTE), LTE Advanced, Wideband Code Division Multiple Access (WCDMA), GSM, or any other 3GPP radio access technology, or other radio access technologies such as e.g. Wireless Local Area Network (WLAN). The communications system 200 may also be referred to as e.g. a wireless communications system, a wireless communications network, a communications network, a network or a system.

The communications system 200 comprises a UE 101 served by a RAN node 203. The RAN node 203 may be a base station such as a NodeB, an eNodeB, RNC, Base Station Controller (BSC), or any other network unit capable to communicate over a radio carrier with the UE 101.

The UE 101 may be a device by which a subscriber may access services offered by an operator's network and services outside the operator's network to which the operator's radio access network and core network provide access, e.g. access to the Internet. The UE 101 may be any device, mobile or stationary, enabled to communicate in the communications network, for instance but not limited to e.g. mobile phone, smart phone, sensors, meters, vehicles, household appliances, medical appliances, media players, cameras, Machine to Machine (M2M) device, Device to Device (D2D) device, Internet of Things (IoT) device or any type of consumer electronic, for instance but not limited to television, radio, lighting arrangements, tablet computer, laptop or Personal Computer (PC). The UE 101 may be portable, pocket storable, hand held, computer comprised, or vehicle mounted devices, enabled to communicate voice and/or data, via the radio access network, with another entity, such as another UE or a server.

The RAN node 203 may be connected to at least one of a cEPC node 205, and a user plane EPC, uEPC, node 208. The communications system 200 may further comprise a User Plane Control Function, UPCF, node 206.

The cEPC node 205 is a common control plane node which is configured to handle substantially all or all control plane signalling in the communication system 200. The cEPC node 205 may perform at least some of an MME function, a SGW function and a PGW function. For example, if the UE 101 is roaming, the cEPC node 205 does not necessarily perform the PGW function, i.e. the communications system 200 may then comprises a standalone PGW node. If the UE 101 is not roaming, the cEPC node 205 may perform the PGW function, in addition to a least one of the MME and SGW function. The cEPC node 205 may also perform at least part of a PCRF function, e.g. the PCRF-Front End (PCRF-FE) function. In some embodiments, the cEPC node 205 is seen as a function integrated and performed by another node in the communications system 200. In other embodiments, the cEPC node 205 is a separate standalone node. Control plane signalling is a type of traffic which may be referred to as signalling traffic.

In some embodiments the UPCF node 206 is a user plane control function integrated and performed by the cEPC node 205. In other embodiments, the UPCF node 206 is a separate standalone node configured to be connected to the cEPC node 205. Regardless of if the UPCF node 206 is a function or a separate node, it may be described as a controller downloading rules to the uEPC node 208, and the uEPC node handles packet forwarding.

The uEPC node 208 is a common user plane node which is configured to handle substantially all or all user plane traffic in the communication system 200. In some embodiments, the uEPC node 208 may also perform e.g., Value Added Service (VAS) such as e.g. Deep Packet Inspection (DPI), QoS, Charging, Lawful interception (LI) etc. The user plane traffic may be referred to as data, user traffic or bearer plane traffic. In some embodiments, the uEPC node 208 is seen as a function integrated and performed by another node in the communications system 200. In other embodiments, the uEPC node 208 is a separate standalone node. The uEPC node 208 may be logically or physically connected to the cEPC node 205. The signalling from the uEPC node 208 to the cEPC node 205 may pass through the UPCF node 206. User plane traffic is a type of traffic which may be referred to as network user traffic.

At least one of the cEPC node 205, the UPCF node 206 and the uEPC node 108 is connected to an operator network 218. The operator network may correspond to the operator's IP services 118 illustrated in FIG. 1.

The cEPC node 205 is configured to be connected to a subscriber database 228. The subscriber database 228 may be e.g. the HSS 128 in FIG. 1, a HLR, a User Profile Server Function (UPSF), AuC or any other suitable database configured to comprise and handle subscriber data associated with the UE 101.

The cEPC node 205 is further configured to be connected to a policy node 230 which is responsible for handling policies for the UE 101. The policy node 203 may be e.g. the PCRF 130 in FIG. 1, a PCEF or any other suitable policy node.

It should be noted that the communication links between the nodes in the communications system 200 may be of any suitable kind including either a wired or wireless link. The link may use any suitable protocol depending on type and level of layer (e.g. as indicated by the OSI model) as understood by the person skilled in the art.

Figure 2B:
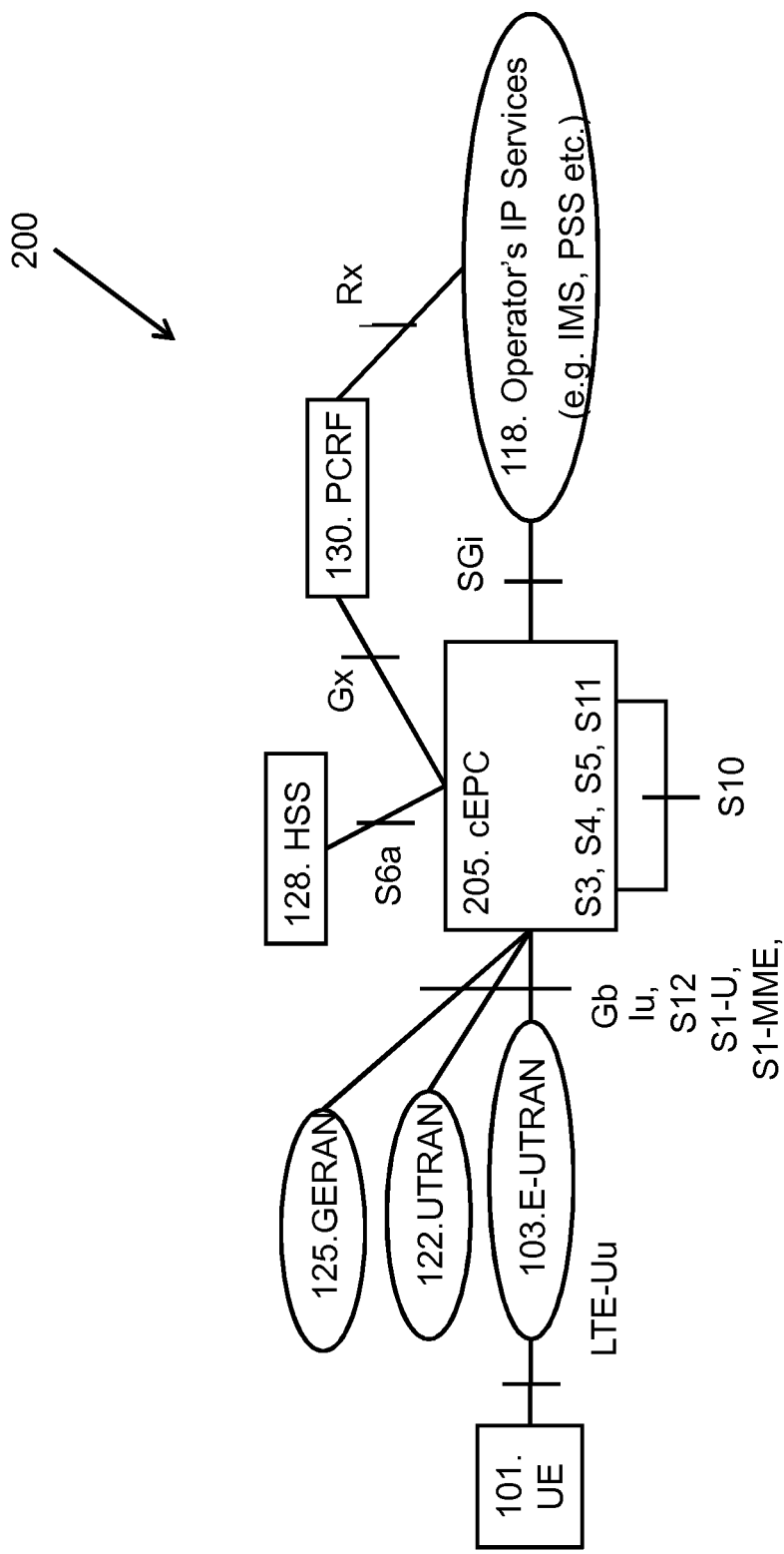
FIG. 2b is a schematic block diagram illustrating embodiments of a non-roaming scenario of a communications system.

FIG. 2b is an example embodiment of a non-roaming scenario of the communications system 200 in FIG. 2a. In the example embodiment in FIG. 2b, the UE 101 is connected to E-UTRAN 103. The E-UTRAN 103 may comprise at least one RAN node such as the RAN node 203 in FIG.

2*a*. The interface between the UE 101 and the E-UTRAN 103 may be referred to as LTE-Uu.

At least one of the E-UTRAN 103, the UTRAN 122 and the GERAN 125 may be connected to the cEPC node 205. The interface between the cEPC node 205 and at least one of the E-UTRAN 103, the UTRAN 122 and the GERAN 125 may be a combination of at least some of the Gb, Iu, S12, S1-U and the S1-MME interfaces. In FIG. 2, S10 may be the name of the interface is between cEPC nodes 205 for cEPC node 205 relocations and cEPC node 205 to cEPC node 205 information transfers. The S3, S4, S5 and S11 interfaces are internally within the cEPC node 205.

The communications system 200 in FIG. 2*b* comprises a HSS 128 which represents the subscriber database 228 in FIG. 2*a*. S6a may be the name of the interface between the cEPC node 205 and the HSS 128. In some embodiments, the cEPC node 205 is connected to a PCRF 130. In other embodiments, the PCRF 130 is included in the cEPC node 205, i.e. the cEPC node 205 performs a PCRF function. The PCRF 130 represents the policy node 230 in FIG. 2*a*. Gx may be the name of the interface between the cEPC node 205 and the PCRF 130. The cEPC node 205 is connected to an operator's IP services 118 which represent the operator network 218 in FIG. 2*a*. SGi may be the name of the reference between the cEPC node 205 and the operator's IP services 118 and Rx may be the name of the interface between the PCRF 130 and the operator's IP services 118.

Figure 1:
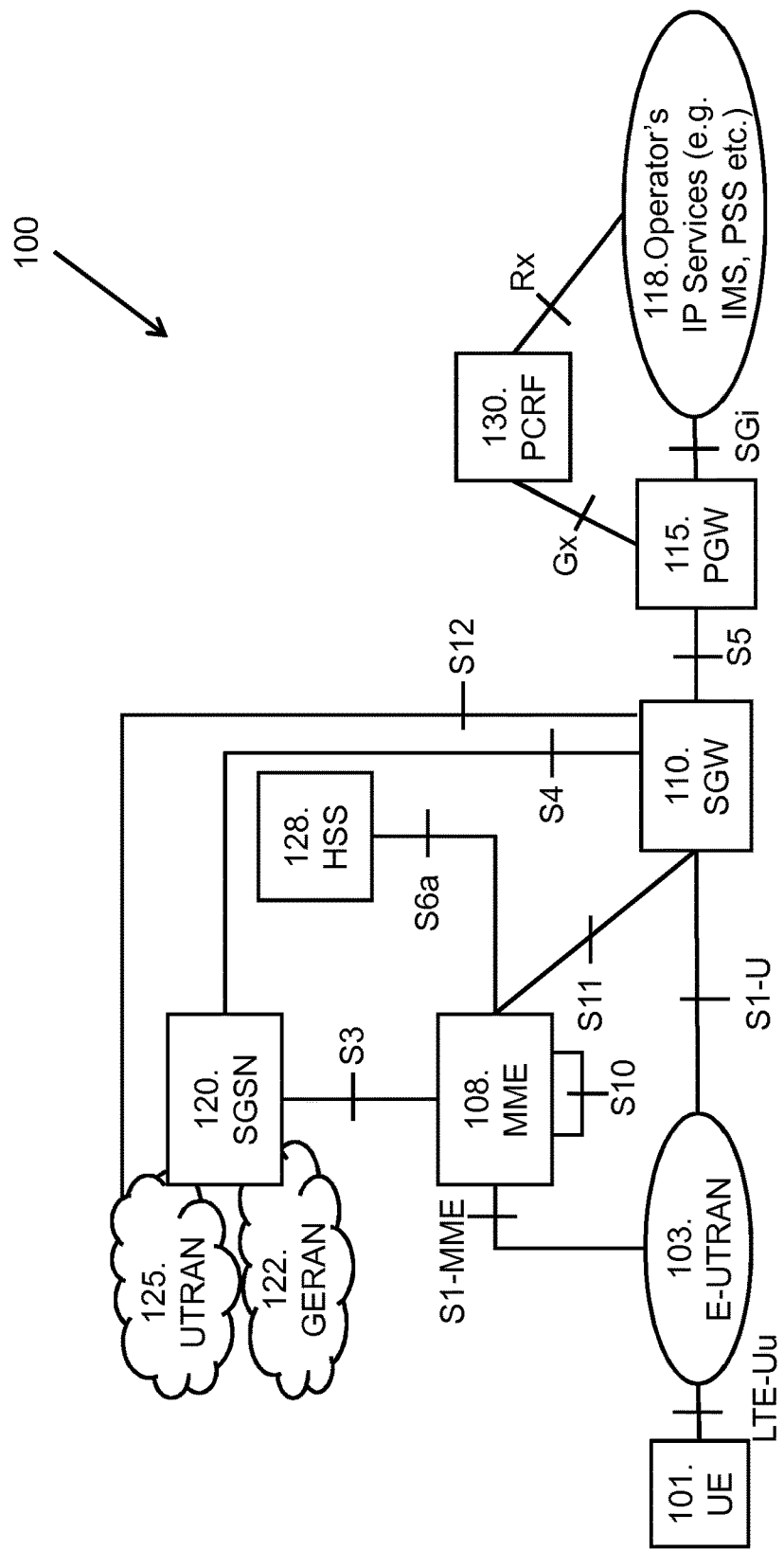
FIG. 1 is a schematic block diagram illustrating embodiments of a 3GPP architecture for non-roaming.

When comparing FIG. 2*b* with FIG. 1, the communication system 200 in FIG. 2*b* comprises separate node functions compared to the communication system 100 in FIG. 1. The MME 108, the SGW 110, the SGSN 120 and the PGW 115 from FIG. 1 are combined in one node in FIG. 2. This combined node is referred to as the cEPC node 205.

Figure 3:
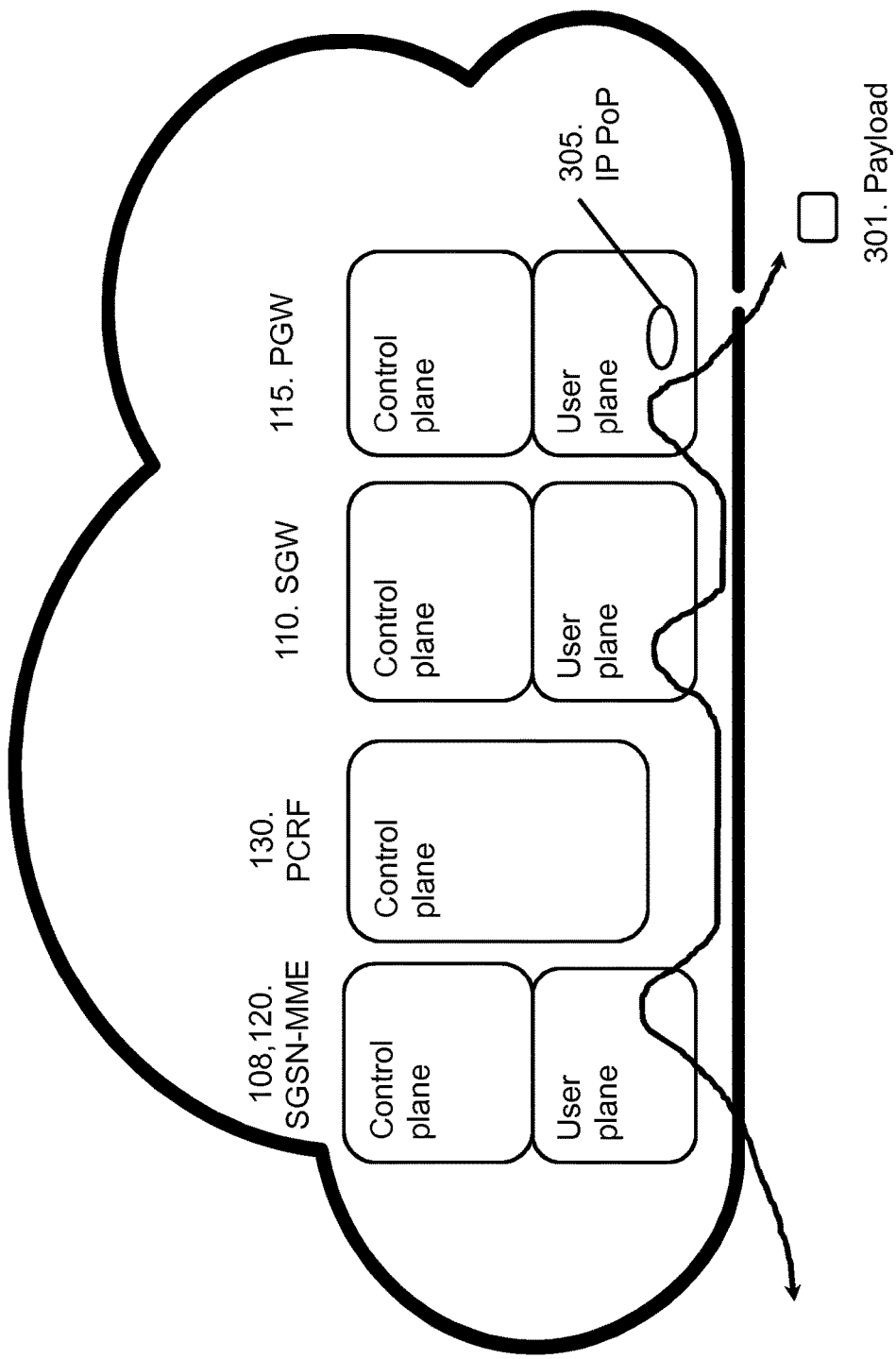
FIG. 3 is a schematic block diagram illustrating embodiments of a communications system with a Virtual Node Function (VNF).
Figure 4:
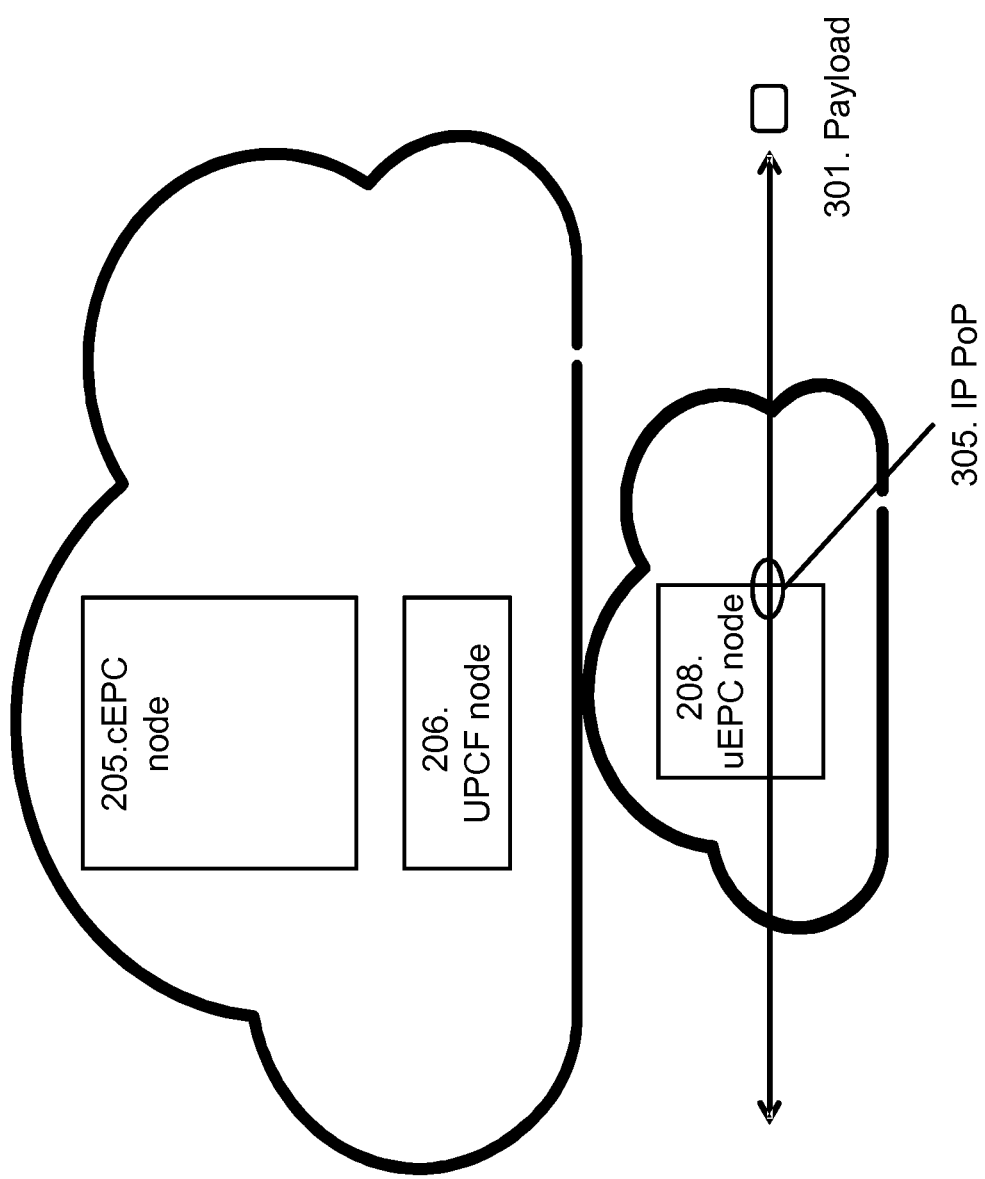
FIG. 4 is a schematic block diagram illustrating embodiments of a communications system with a VNF and a control plane and user plane split (e.g. SDN).

The difference between FIGS. 1 and 2*b* may be illustrated in another way as seen in FIGS. 3 and 4. FIG. 3 is an alternative illustration of the communications system 100 in FIG. 1 comprising a VNF. In FIG. 3, it is illustrates that the four nodes SGSN-MME 108, 120, the PCRF 130, the SGW 110 and the PGW 115 each has a respective control plane part and a user plane part, except for the PCRF 130 which only has a control plane part. A payload 301 to and/or from the UE 101 goes through the user plane part of the SGSN-MME 118, 120, the SGW 110 and the PGW 115 (i.e. it does not go through the PCRF 130 which is only related to the control plane).

The cloud in FIG. 3 represents that the nodes (e.g. at least some of the SGSN-MME 108, 120, the PCRF 130, the SGW 110 and the PGW 115) may be virtual nodes running in the same data centre. The nodes in the cloud may be connected to each other. The IP Point of Presence (IP PoP) 305 seen in FIG. 3 is an access point from the cloud to e.g. the Internet. With the communications system 100 in FIGS. 1 and 3, each VNF needs to be scaled on a logical nodal level which may lead to a potential overcommission 4 times, one time in each node. The payload needs to pass three logical instances which leads to increased latency of payload. Furthermore, the latency of the signaling may also be reduced due to one function instead of four functions. In FIGS. 1 and 3, there are four different instances where the chain may break from a signaling perspective which makes the embodiment vulnerable. There are three different instances in FIG. 3 where the chain may break from a payload perspective which also makes the embodiment vulnerable. If the cEPC node 205 needs update, then the payload is also affected. Because of this, the communications system 100 in FIGS. 1 and 3 are less flexible for new features and there will be a longer TTM.

FIG. 4 is an alternative illustration of the communications system 200 in FIG. 2*a* comprising VNFs and a split control plane and user plane (e.g. SDN). As seen in FIG. 4, the control plane in the four nodes in FIG. 3 is replaced by one common cEPC node 205, e.g. in the cloud, and the user plane in the four nodes in FIG. 3 is replaced by one common uEPC node 208 e.g. based on SDN. In addition, a UPCF node 206 may be a function integrated in the cEPC node 205 or a separate UPCF node 206 configured to be connected to the cEPC node 205. The cEPC node 205 may be connected to the uEPC node 208 through service chaining. The cEPC node 205 may be a function implemented in an existing node or a standalone node dedicated for the common EPC function. The uEPC node 208 may be a function implemented in an existing node or a standalone node dedicated for the uEPC function.

The top cloud (referred to as e.g. control plane cloud) in FIG. 4 illustrates that the cEPC node 205 and the UPCF node 206 may be virtual nodes running in the same data centre. The bottom cloud (referred to as e.g. user plane cloud) in FIG. 4 illustrates that the uEPC node 208 may be a virtual node running in the same data centre. In other words, there are two different data centres where the top one runs the control plane and the bottom one illustrates the user plane (also referred to as data plane). The IP PoP 305 seen in FIG. 3 is an access point from the user plane cloud to e.g. the Internet. The payload 301 goes through the uEPC node 208 in the user plane cloud.

Summarized, the embodiments of the communications system 200 illustrated in FIGS. 2*a*, 2*b* and 4 have a considerably lower amount of nodes through which signalling and payload needs to pass compared to the embodiments of the communications system 100 illustrate din FIGS. 1 and 3. With the example embodiments of the communications system 200 in FIGS. 2*a*, 2*b* and 4, at least some of the drawbacks of the communications system 100 illustrated in FIGS. 1 and 3 are removed. The communication system 200 in FIGS. 2*a*, 2*b* and 4 are scalable on a per UE basis which enables CAPEX savings. The communications system 200 in FIGS. 2*a*, 2*b* and 4 are easier to maintain compared to the one in FIGS. 1 and 3 because it is only one instance instead of four that needs to be managed. This implies OPEX savings. With the embodiments in FIGS. 2*a*, 2*b* and 4, it is possible to introduce new services without affecting the user plane which may lead to a quicker TTM. Such new services may be for example new end to end solutions and features such as Voice over LTE (VoLTE) and Video over LTE (ViLTE). Furthermore, the embodiments herein may provide vendor accountability as well as built-in end to end solution coordination.

The terms SDN and service chaining mentioned above will now shortly be described. SDN involves decoupling network control from forwarding functions and allowing a centralized network controller to control the behaviour of the entire network. Thus, a network operator may, via high level SDN controller, specify the behaviour of the entire network compared to conventional networks in which the network operator needs to perform low level configuration of each device in order to specify the behaviour of the network. Service chaining is a concept that has obtained increased importance with the rise of SDN. A service chain may be described as at least one service in a specific order and chained together to provide a complete service. Service chaining may be described as a mechanism for creating service chains and forwarding traffic flows through the chains. The forwarding of the traffic flows may be based on subscription. With SDNs, network operators are enabled to dynamically handle (e.g. create, modify, remove) service chains.

The method for handling control plane signaling in the communications system 200 according to some embodiments will now be described with reference to the signaling diagrams in FIGS. 5a, 5b, 6a, 6b, 7a, 7b, 8a, 8b, 9a, 9b, 10a, 10b, 11a, 11b, 12a and 12b. The figures with the letter a in its number refers to a communications system 100 as illustrated in e.g. FIGS. 1 and 3. The figure with the letter b in its number refers to a communications system 200 as illustrated in e.g. FIGS. 2a, 2b and 4. The figures with the same number shows the same procedure, but with reference to different communication systems 100 or 200.

Figure 5A:
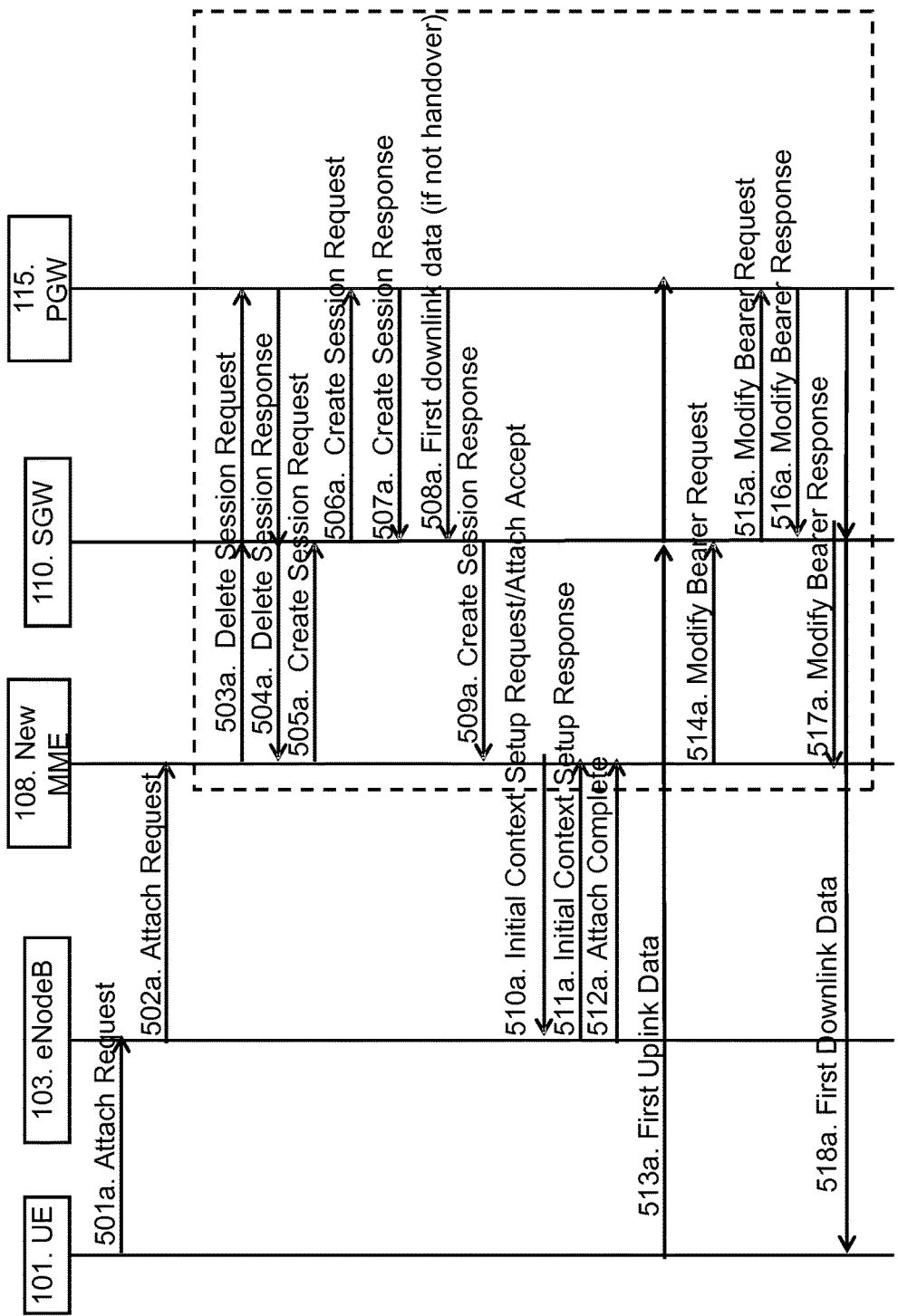
FIG. 5a is a signaling diagram illustrating embodiments of a phase 1 of a legacy attach procedure.
Figure 5B:
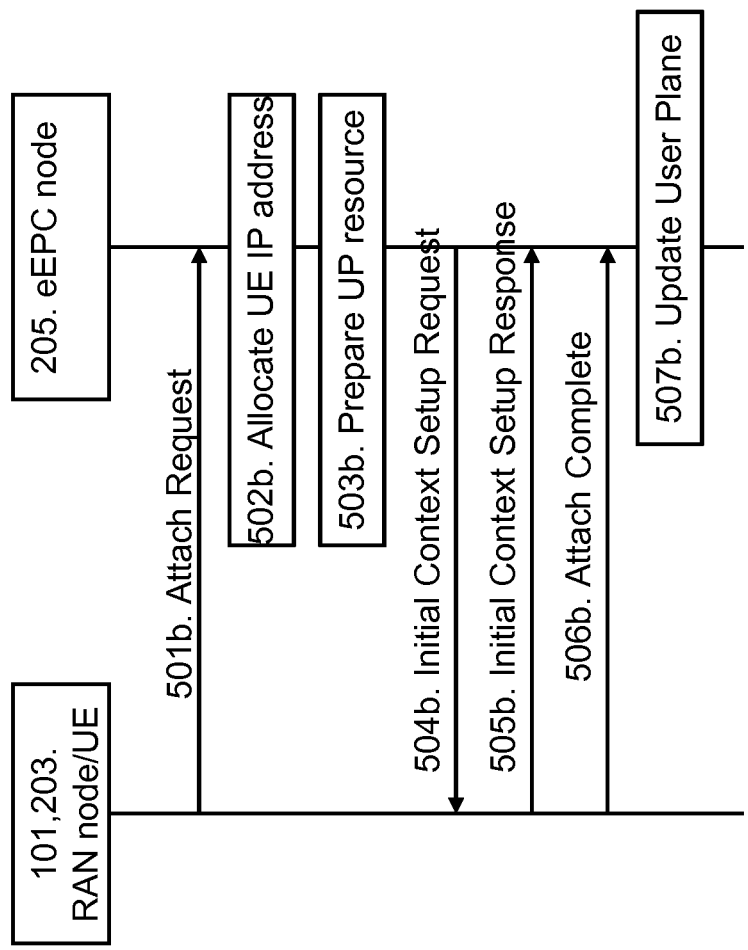
FIG. 5b is a signaling diagram illustrating embodiments of a phase 1 of an attach procedure.

The method for handling control plane signaling according to some embodiments will now be described with reference to the signaling diagrams in FIGS. 5a and 5b. In particular, FIG. 5a shows an example embodiment of a phase 1 of an attach procedure with reference to FIGS. 1 and 3. FIG. 5b shows an example embodiment of an attach procedure with reference to FIGS. 2a, 2b and 4. Phase 1 is a phase with a home subscriber without involving a PCRF 130. Phase 2 and 3 will be described later and relates to a home subscriber which involves the PCRF 130 and to roaming subscribers, respectively. Phase 2 will be described later with reference to FIGS. 10a and 10b and phase 3 will be described later with reference to FIGS. 12a and 12b. An attach procedure is a procedure when the UE 101 registers with the network to receive services that require registration.

Starting with FIG. 5a, the method in FIG. 5a illustrating the attach procedure comprises at least some of the following steps, which steps may as well be carried out in another suitable order than described below. Note that the dotted box in FIG. 5a will be described later with reference to FIG. 5b. The procedure seen in FIG. 5a may also be referred to as a legacy procedure.

Step 501a

Figure 10A:
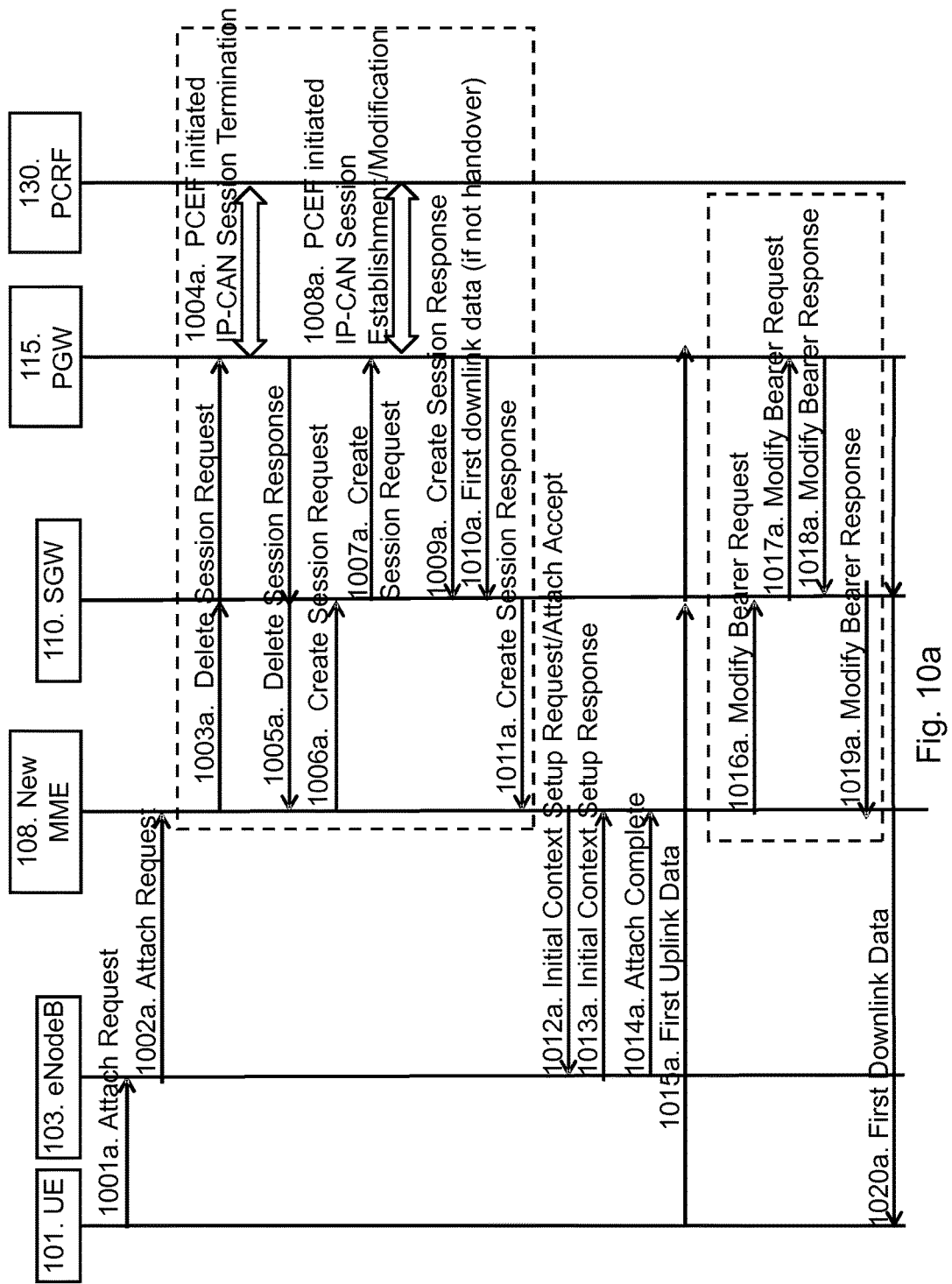
FIG. 10a is a signaling diagram illustrating embodiments of a phase 2 of a legacy attach procedure including the PCRF and the Gx interface.
Figure 12A:
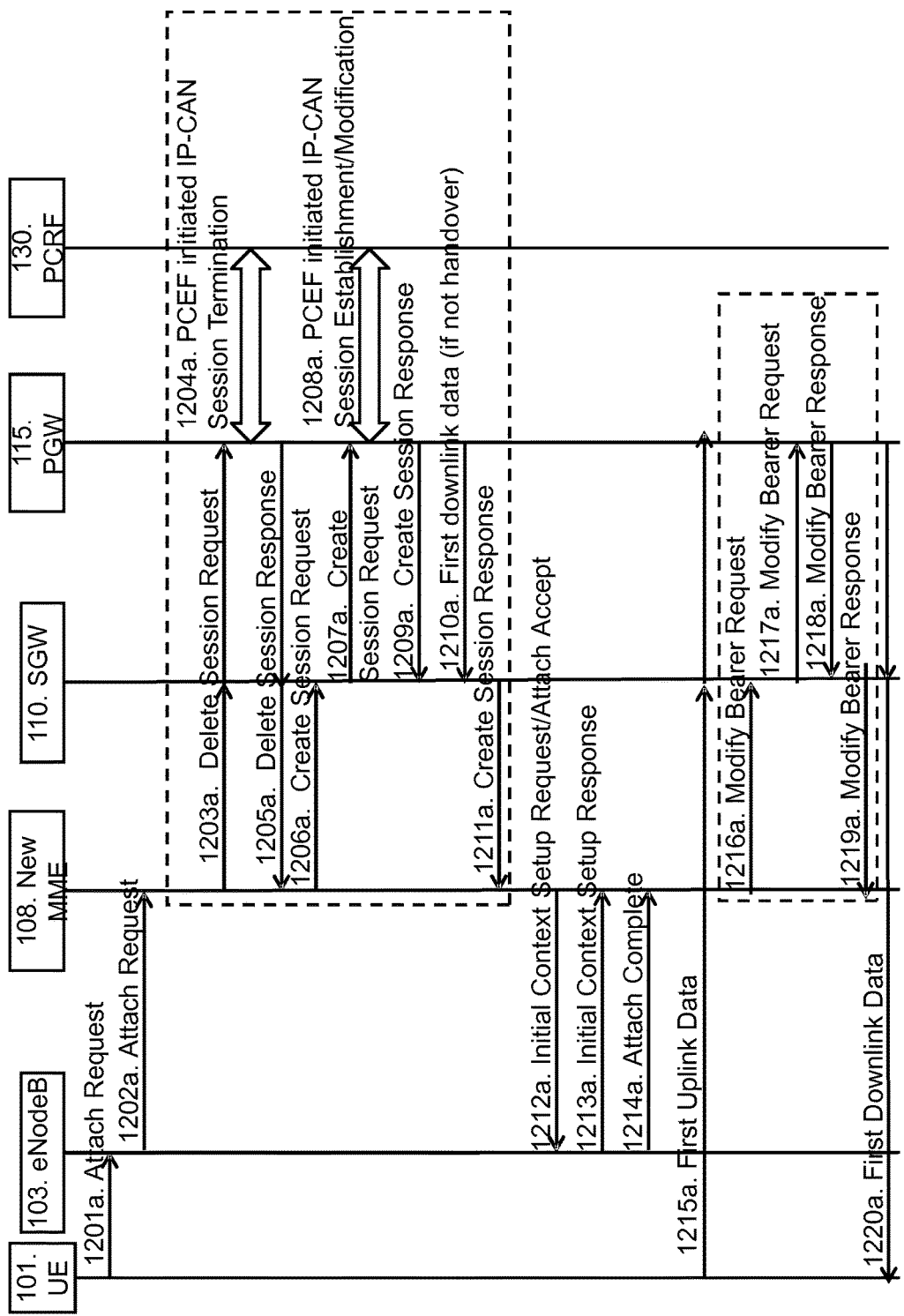
FIG. 12a is a signaling diagram illustrating embodiments of phase 3 of a legacy attach procedure when the UE is roaming.

This step corresponds to step 1001a in FIG. 10a and step 1201a in FIG. 12a. The UE 101 sends an attach request message to the eNodeB 103. The attach request message is a request for attach to the eNodeB 103.

Step 502a

This step corresponds to step 1002a in FIG. 10a and step 1202a in FIG. 12a. The eNodeB 103 sends the attach request message from the UE 101 further to the new MME 108. In FIG. 5a, the new MME is the MME which the UE 101 shall be connected to. In the following, the reference number 108 will be used for any MME regardless of whether it is a new or an old MME.

Step 503a

This step corresponds to step 1003a in FIG. 10a and step 1203a in FIG. 12a. The new MME 108 may send a Delete Session Request message to the SGW 110 and the SGW 110 sends the Delete Session Request message further to the PGW 115. The Delete Session Request message is a request for deletion of a current session for the UE 101.

Step 504a

This step corresponds to step 1005a in FIG. 10a and step 1205a in FIG. 12a. When the PGW 115 has deleted the session, the PGW 115 sends a Delete Session Response message to the SGW 110 and the SGW 110 sends the Delete Session Response message to the new MME 108. The SGW 110 may also delete the session before sending the Delete Session response message to the new MME 108. The response message is a response to the request message in step 503a in FIG. 5a, step 1003a in FIG. 10 and step 1203a in FIG. 12a. The response message indicates that the session has been deleted.

Step 505a

This step corresponds to step 1006a in FIG. 10a and step 1206a in FIG. 12a. The new MME 108 sends a Create Session Request message to the SGW 110. The Create Session Request message is a request for creation of a session for the UE 101 at the SGW 110 and the PGW 115.

Step 506a

This step corresponds to step 1007a in FIG. 10a and step 1207a in FIG. 12a. The SGW 110 sends a Create Session Request message to the PGW 115, e.g. it forwards the message from step 505a in FIG. 5a, step 1006a in FIG. 10a and step 1206a in FIG. 12a.

Step 507a

This step corresponds to step 1009a in FIG. 10a and step 1209a in FIG. 12a. When the PGW 115 has created a session for the UE 101 including the UEs IP address (e.g. the PDN connection), the PGW 115 sends a Create Session Response message to the SGW 110. The response message is a response to the request message in step 506a in FIG. 5a, step 1007a in FIG. 10a and step 1207a in FIG. 12a. The response message indicates that the session has been created.

Step 508a

This step corresponds to step 1010a in FIG. 10a and step 1210a in FIG. 12a. If there is no handover of the UE 101 to another eNodeB 103, the PGW 115 may send the first downlink data to the SGW 110. If there is no handover, it may be possible that downlink data is sent to the SGW 110 at this step.

Step 509a

This step corresponds to step 1011a in FIG. 10a and step 1211a in FIG. 12a. The SGW 110 sends a Create Session Response message to the eNodeB 103. This step 509a may be triggered by step 505a in FIG. 5a, step 1006a in FIG. 10a and step 1206a in FIG. 12a. The response message indicates that the session has been created, as requested.

Step 510a

This step corresponds to step 1012a in FIG. 10a and step 1212a in FIG. 12a. The new MME 108 sends an initial Context Setup Request message and an Attach Accept message to the eNodeB 103. The Attach Accept message is a response to the Attach Request message in step 502a in FIG. 5a, step 1002a in FIG. 10a and step 1202a in FIG. 12a.

Step 511a

This step corresponds to step 1013a in FIG. 10a and step 1213a in FIG. 12a. The eNodeB 103 sets up an initial context for the UE 101 and sends an initial Context Setup Response message to the new MME 108. The response message is a response to the initial context setup request message in step 510a in FIG. 5a, step 1012a in FIG. 10a and step 1212a in FIG. 12a.

Step 512a

This step corresponds to step 1014a in FIG. 10a and step 1214a in FIG. 12a. When the attach of the UE 101 to the eNodeB 103 is complete, the eNodeB 103 sends an attach complete message to the new MME 108. The attach complete message originates from the UE 101. The attach complete message indicates that the attach which was requested by the UE 101 in step 501a in FIG. 5a, step 1001a in FIG. 10a and step 1201a in FIG. 12a has been completed by the eNode B103.

Step 513a

This step corresponds to step 1015a in FIG. 10a and step 1215a in FIG. 12a. The UE 101 may send a first uplink data to the PGW 115 via the SGW 110.

Step 514a

This step corresponds to step 1016a in FIG. 10a and step 1216a in FIG. 12a. The new MME 108 sends a modify bearer request message to the SGW 110.

Step 515a

This step corresponds to step 1017a in FIG. 10a and step 1217a in FIG. 12a. The SGW 110 may send a modify bearer request message to the PGW 115. The PGW 115 modifies the bearer when the request message has been received.

Step 516a

This step corresponds to step 1018a in FIG. 10a and step 1218a in FIG. 12a. When the PGW 115 has modified the bearer as requested by the new MME 108, the PGW 115 sends a modify bearer response message to the SGW 110. The response message is a response to the request message in step 515a in FIG. 5a, step 1017a in FIG. 10a and step 1217a in FIG. 12a.

Step 517a

This step corresponds to step 1019a in FIG. 10a and step 1219a in FIG. 12a. The SGW 110 sends a modify bearer response message to the new MME 108 which indicates that the bearer has been modified. The response message is a response to the request message in step 514a in FIG. 5a, step 1016a in FIG. 10a and step 1216a in FIG. 12a.

Step 518a

This step corresponds to step 1020a in FIG. 10a and step 1220a in FIG. 12a. The PGW 115 may send a first downlink data to the UE 101 via the SGW 110 using the modified bearer. The PGW 115 may send this first downlink data if it has received any packets.

The attach procedure will now be described with reference to FIG. 5b using the communications system in FIGS. 2a, 2b and 4 as a reference. The method seen in FIG. 5b comprises the at least some of the following steps, which steps may as well be carried out in another suitable order than described below.

Step 501b

Figure 10B:
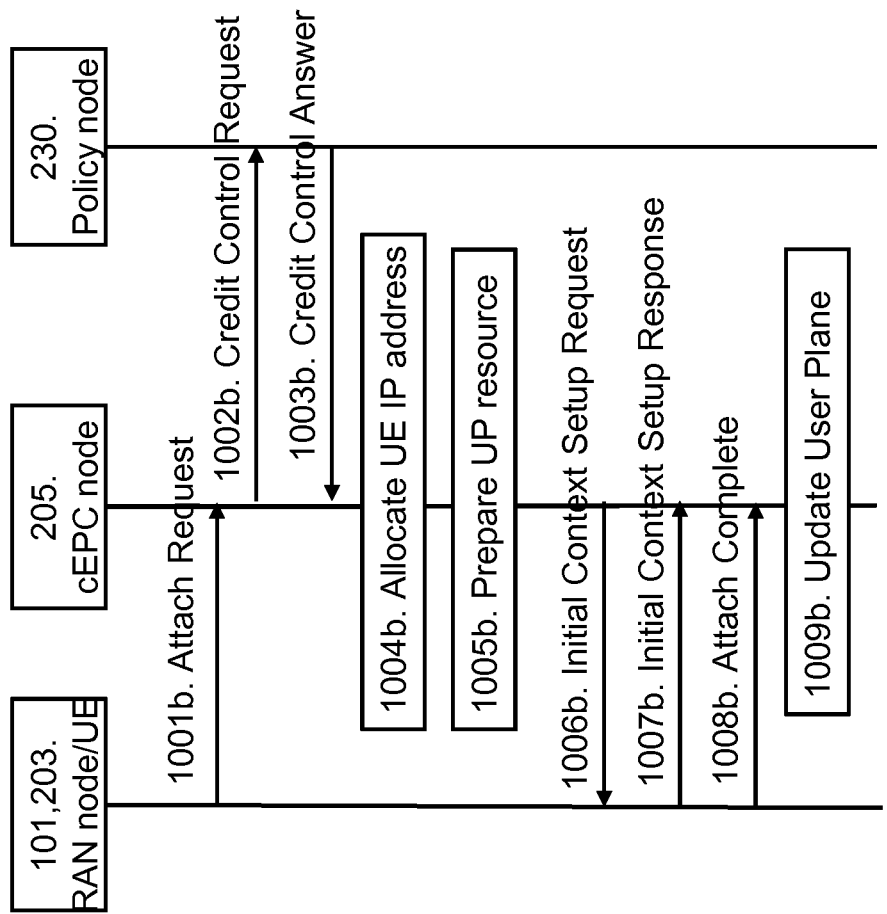
FIG. 10b is a signaling diagram illustrating embodiments of a phase 2 of an attach procedure including the policy node.
Figure 12B:
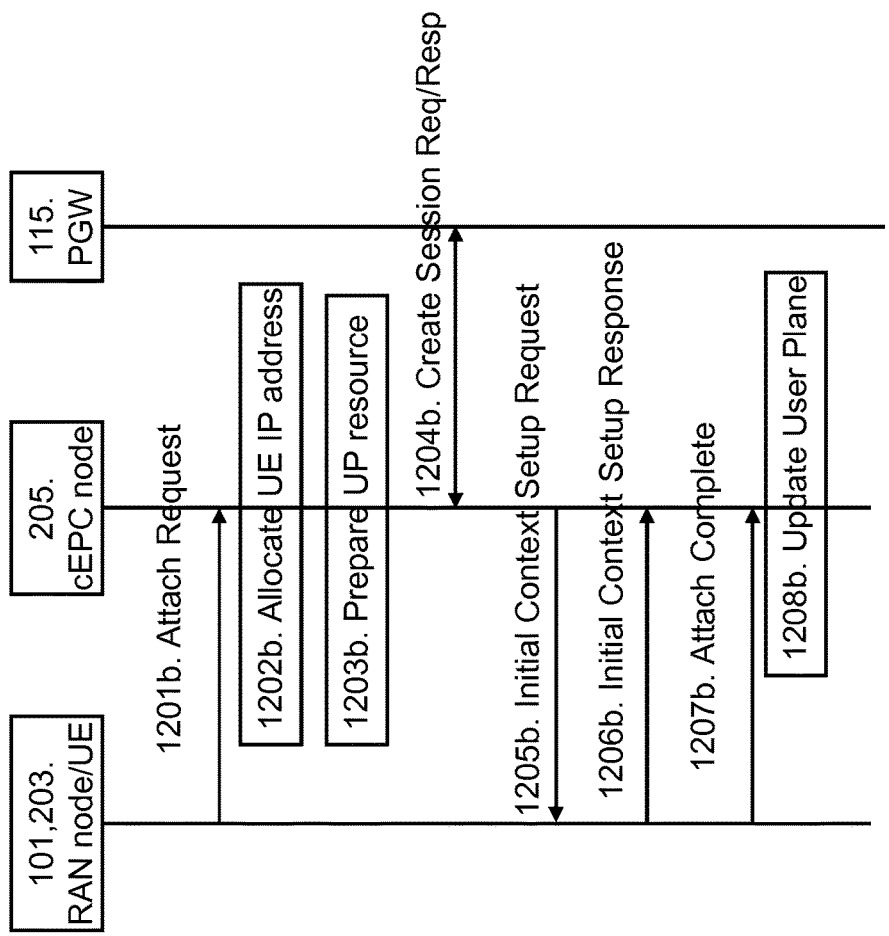
FIG. 12b is a signaling diagram illustrating embodiments of phase 3 of an attach procedure when the UE is roaming.

This step corresponds to step 1001b in FIG. 10b and step 1201b in FIG. 12b. The UE 101 sends an attach request message via the RAN node 203 to the cEPC node 205. The content of the message is the same as the messages in steps 501a and 502a in FIG. 5a, but the receiver of the message is different.

Step 502b

This step corresponds to step 1004b in FIG. 10b and step 1202b in FIG. 12b. Based on the received attach request, the cEPC node 205 allocates an IP address for the UE 101. This allocation of the IP address for the UE 100 in step 502b may be the same as after the step 506a in FIG. 5a.

Step 503b

This step corresponds to step 1005b in FIG. 10b and step 1203b in FIG. 12b. Further based on the received attach request, the cEPC node 205 prepares User Plane (UP) resources for the UE 101. The UP resources for the UE 101 may an internal user plane or distributed user plane using the UPCF node 206 and the uEPC node 208.

Step 504b

This step corresponds to step 1006b in FIG. 10b and step 1205b in FIG. 12b. The cEPC node 205 sends an initial context setup request message to the RAN node 203 and an attach accept message to the UE 101. Consequently, the RAN node 203 sets up the initial context for the UE 101, as requested. This message is the same message as in step 510a in FIG. 5a except that the sender of the message is a different node, i.e. the cEPC node 205.

Step 505b

This step corresponds to step 1007b in FIG. 10b and step 1206b in FIG. 12b. When the RAN node 203 has set up the initial context for the UE 101, the RAN Node 203 sends an initial context setup response message to the cEPC node 205. The initial context setup response message is a response to the request message in step 504b in FIG. 5b, step 1006b in FIG. 10b and step 1205b in FIG. 12b. The response message indicates that the initial context for the UE 101 has been setup, as requested.

Step 506b

This step corresponds to step 1008b in FIG. 10b and step 1207b in FIG. 12b. When the attach of the UE 101 has been completed, the RAN node 203 sends an attach complete message to the cEPC node 205. The attach complete message is a response to the attach accept message sent to the UE 101 in step 504b in FIG. 5b, step 1006b in FIG. 10b and step 1205b in FIG. 12b.

Step 507b

This step corresponds to step 1009b in FIG. 10b and step 1208b in FIG. 12b. When the UE 101 has attached to the eNodeB 203, the cEPC node 205 updates the user plane information for the UE 101. The user plane information may be updated with information received from the RAN node 203 regarding downlink data transports. The UP information for the UE 101 may be for an internal user plane or for a distributed user plane using the UPCF node 206 and the uEPC node 208.

When comparing FIG. 5a and FIG. 5b, FIG. 5a comprises eighteen steps and FIG. 5b comprises seven steps. The steps in the dotted box (step 503a-509a, and 514a-517a) in FIG. 5a are not performed in step 5b. Thus, with the cEPC node 205, the amount of signaling is reduced in the attach procedure in FIG. 5b.

Figure 6A:
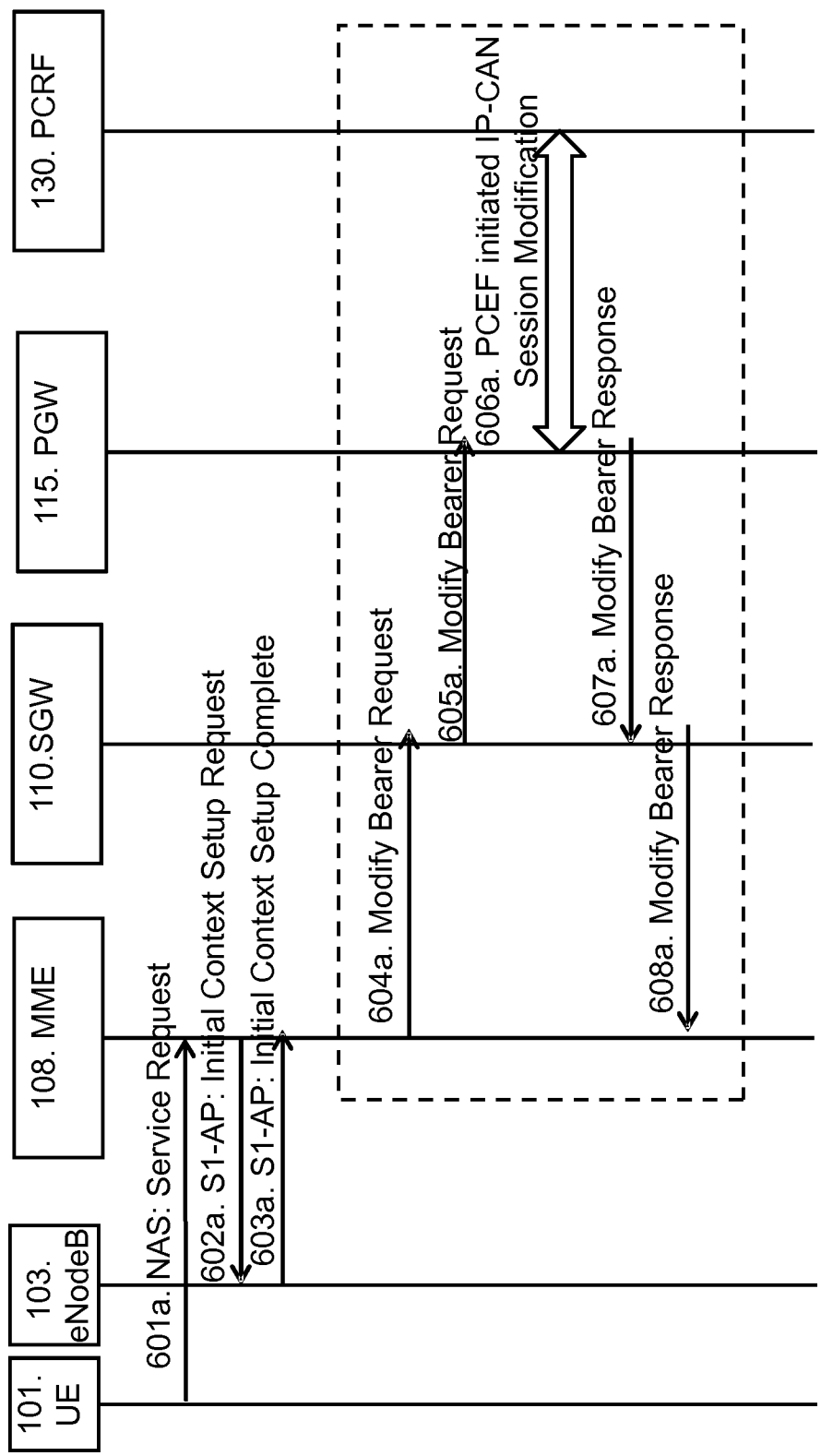
FIG. 6a is a signaling diagram illustrating embodiments of a legacy service request procedure initiated by the UE.
Figure 6B:
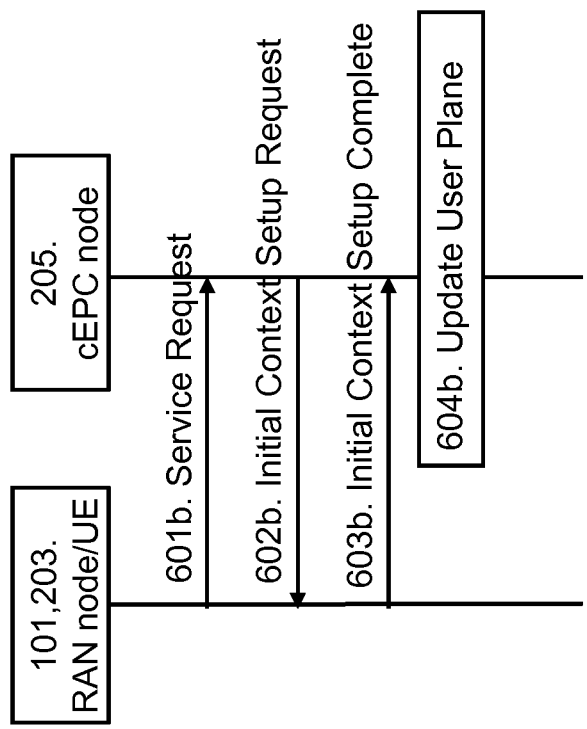
FIG. 6b is a signaling diagram illustrating embodiments of a service request procedure initiated by the UE.

The method for handling control plane signaling according to some embodiments will now be described with reference to the signaling diagrams in FIGS. 6a and 6b. In particular, FIG. 6a shows an example embodiment of a service request procedure with reference to FIGS. 1 and 3. FIG. 6b shows an example embodiment of a service request procedure with reference to FIGS. 2a, 2b and 4. A service request procedure is a procedure initiated by the UE 101 to start the establishment of a NAS signalling connection.

Starting with FIG. 6a, the method in FIG. 6a illustrating the service request procedure initiated by the UE 101 comprises at least some of the following steps, which steps may as well be carried out in another suitable order than described below. Note that the dotted box in FIG. 6a will be described later with reference to FIG. 6b. The procedure seen in FIG. 6a may also be referred to as a legacy procedure.

Step 601a

Figure 11A:
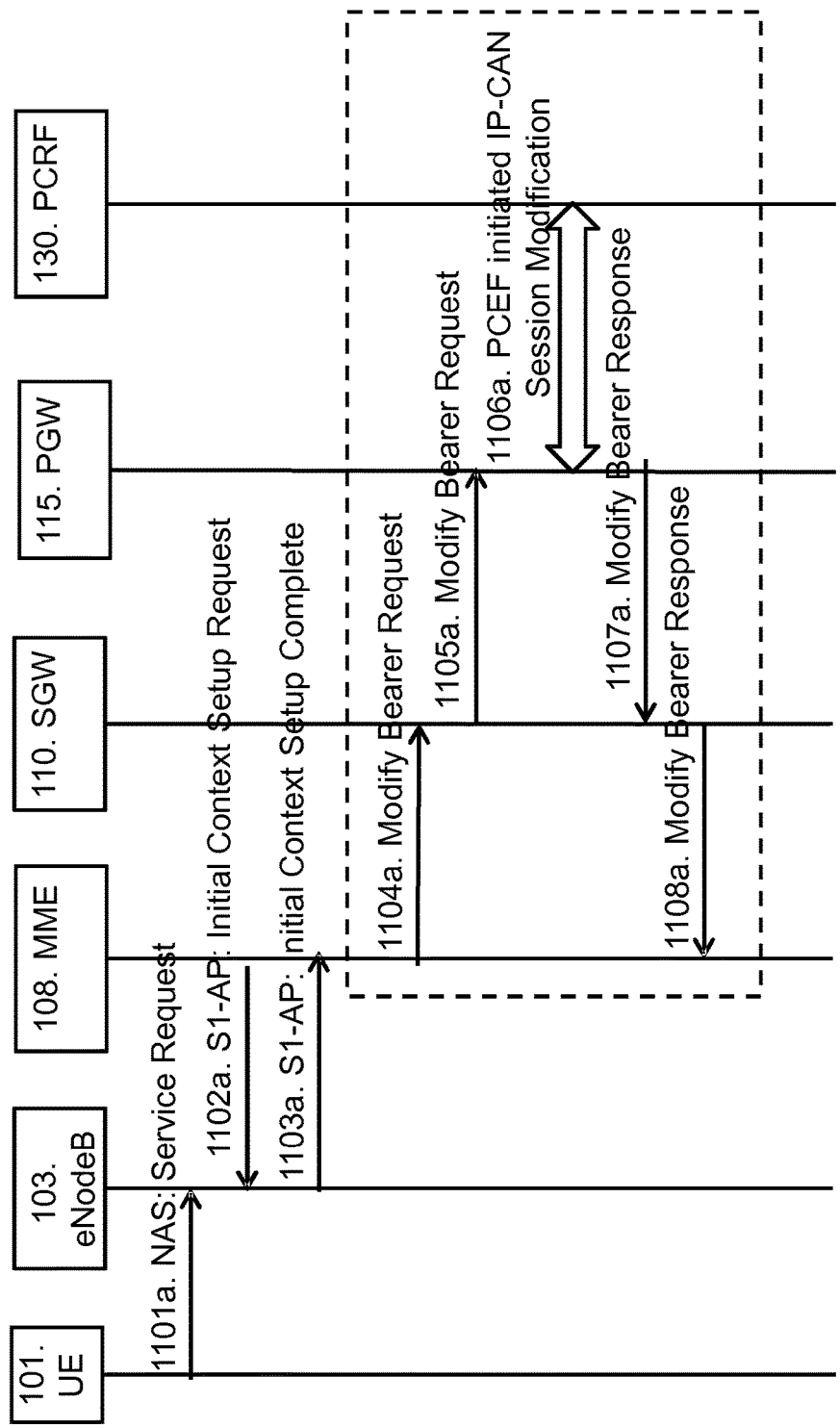
FIG. 11a is a signaling diagram illustrating embodiments of a legacy service request procedure initiated by the UE.

This step corresponds to step 1101a in FIG. 11a. The UE 101 initiates and sends a Service request message to the MME 108. The service request message is a NAS message. NAS is a functional layer between the core network and the UE 101 which is used to manage establishment of communication sessions and for maintaining continuous communications with the UE 101 as it moves. The service request message is a request for a service to the UE 101.

Step 602a

This step corresponds to step 1102a in FIG. 11a. The MME 108 sends an initial context setup request message to the eNodeB 103. The request message is sent using the S1-AP interface between the eNodeB 103 and the MME 108.

Step 603a

This step corresponds to step 1103a in FIG. 11a. When the eNodeB 103 has completed the requested setup of the initial context, the eNodeB 103 sends an initial context setup complete message to the MME 108. The message is sent using the S1-AP interface.

Step 604a

This step corresponds to step 1104a in FIG. 11a. The MME 108 sends a modify bearer request message to the SGW 110.

Step 605a

This step corresponds to step 1105a in FIG. 11a. The SGW 110 sends a modify bearer request message to the PGW 115.

Step 606a

This step corresponds to step 1106a in FIG. 11a. A PCEF initiated Internet Protocol-Connectivity Access Network (IP-CAN) session modification procedure may be executed between the PGW 115 and the PCRF 130. Thus, the bearer is modified as requested. IP-CAN is an access network that provides IP connectivity Step 607a This step corresponds to step 1107a in FIG. 11a. When the bearer is modified, the PGW 115 sends a modify bearer response message to the SGW 110. The response message is a response to the request message in step 605a in FIG. 6a and step 1105a in FIG. 11a.

Step 608a

This step corresponds to step 1108a in FIG. 11a. The SGW 110 sends a modify bearer response message to the MME 108. The modify bearer response message is a response to the request message in step 604a which indicates that the bearer is modified.

The service request procedure initiated by the UE 101 will now be described with reference to FIG. 6b using the communications system in FIGS. 2a, 2b and 4 as a reference. The method seen in FIG. 6b comprises the at least some of the following steps, which steps may as well be carried out in another suitable order than described below.

Step 601b

Figure 11B:
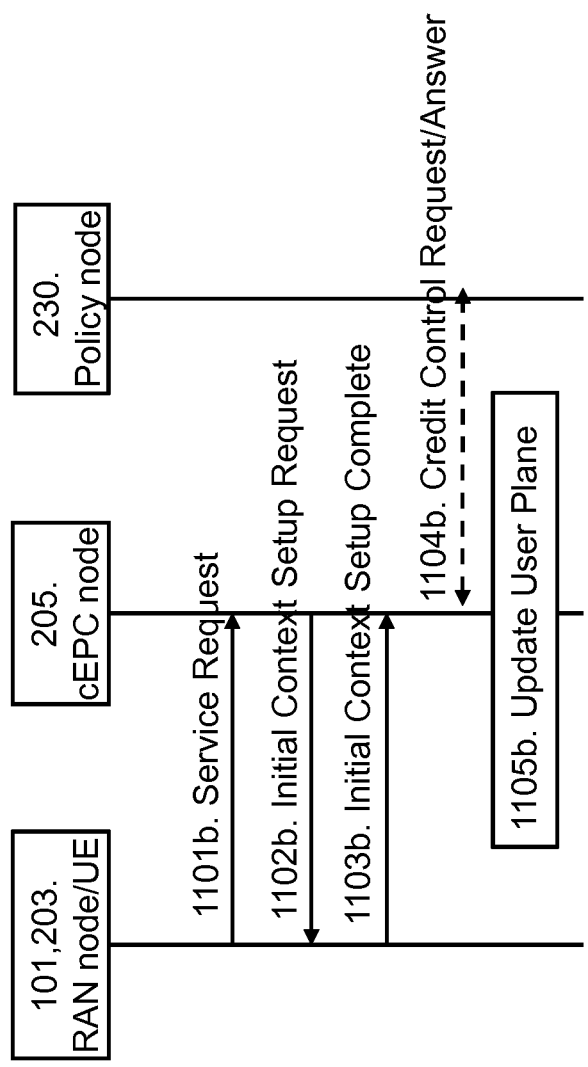
FIG. 11b is a signaling diagram illustrating embodiments of a service request procedure initiated by the UE.

This step corresponds to step 1101b in FIG. 11b. The UE 101 sends a service request message to the cEPC node 205. The service request message is a request for as service to the UE 101.

Step 602b

This step corresponds to step 1102b in FIG. 11b. The cEPC node 205 sends an initial context setup request message to the RAN node 203. When the RAN node 203 receives the request message, it sets up the requested context for the service requested by the UE 101.

Step 603b

This step corresponds to step 1103b in FIG. 11b. When the RAN node 203 has set up the requested context, the RAN node 203 sends an initial context setup complete message to the cEPC node 205. The complete message indicates that the setup of the context has been completed.

Step 604b

This step corresponds to step 1105b in FIG. 11b. When the context has been set up, the cEPC node 205 updates the user plane. The user plane may an internal user plane or a distributed user plane using the UPCF node 206 and the uEPC node 208.

When comparing FIG. 6a and FIG. 6b, FIG. 6a comprises eight steps and FIG. 6b comprises four steps. The steps in the dotted box (step 604a-608a) in FIG. 6a are not performed in step 6b. Thus, with the cEPC node 205, the amount of signaling is reduced in the service request procedure in FIG. 6b.

Figure 7A:
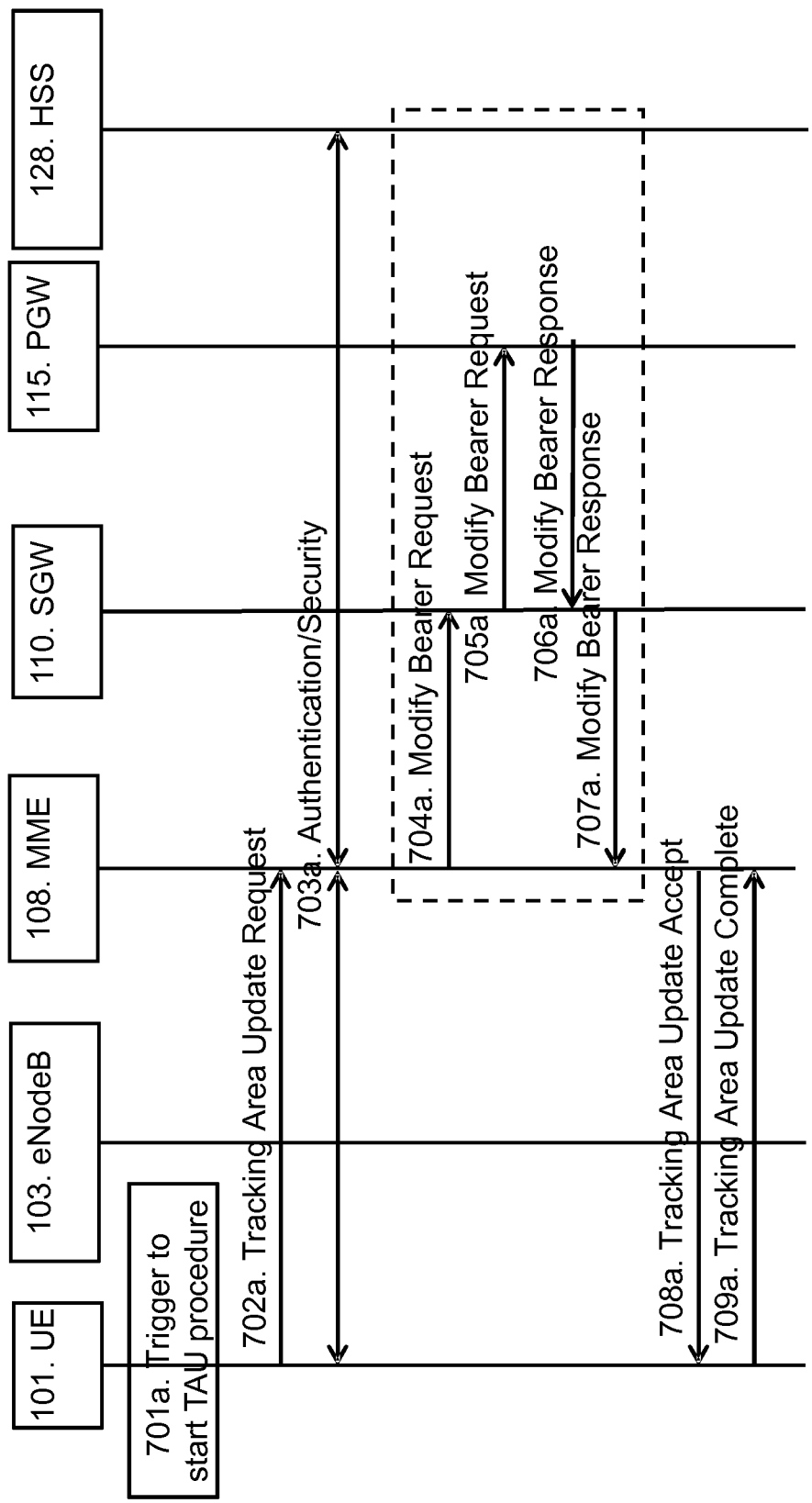
FIG. 7a is a signaling diagram illustrating embodiments of a legacy intra-Tracking Area Update (TAU) procedure without a SGW change.
Figure 7B:
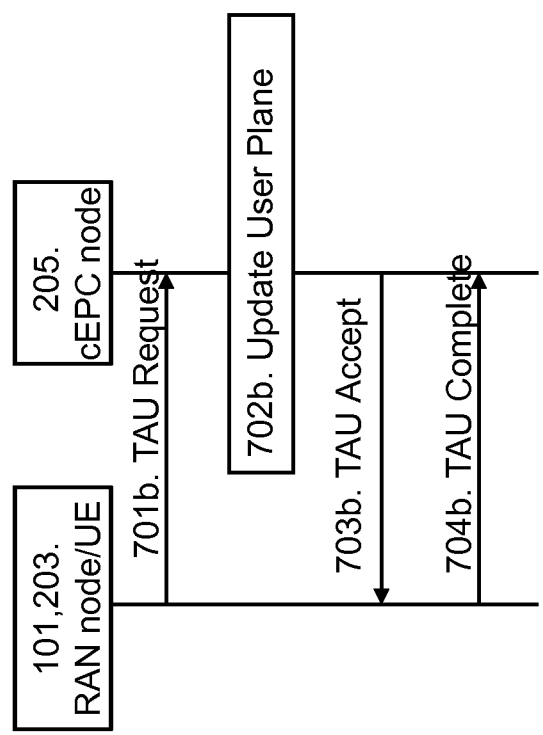
FIG. 7b is a signaling diagram illustrating embodiments of an intra-TAU procedure without a SGW change.

The method for handling control plane signaling according to some embodiments will now be described with reference to the signaling diagrams in FIGS. 7a and 7b. In particular, FIG. 7a shows an example embodiment of an intra TAU procedure without SGW change with reference to FIGS. 1 and 3. A TAU procedure takes place when the UE 101 enters a new TA, and is a procedure initiated by the UE 101 to update the registration status with the network. FIG. 7b shows an example embodiment of an intra TAU procedure without SGW change with reference to FIGS. 2a, 2b and 4.

Starting with FIG. 7a, the method in FIG. 7a illustrating the attach procedure comprises at least some of the following steps, which steps may as well be carried out in another suitable order than described below. Note that the dotted box in FIG. 7a will be described later with reference to FIG. 7b. The procedure seen in FIG. 7a may also be referred to as a legacy procedure.

Step 701a

The UE 101 and possibly also the eNodeB 103 detects a trigger to start a TAU procedure. UE mobility and a RAN change may be examples of triggers to start the TAU procedure.

Step 702a

The UE 101 sends a tracking area update request message to the MME 108.

Step 703a

Authentication and security procedures are performed between the UE 101 and the MME 108 and between the MME 108 and the HSS 128.

Step 704a

The MME 108 sends a modify bearer request message to the SGW 110.

Step 705a

The SGW 110 may send a modify bearer request message to the PGW 115. As a result, the PGW 115 modifies the bearer, as requested.

Step 706a

When the PGW 115 has modified the bearer, the PGW 115 sends a modify bearer response message to the SGW 110. The response message is a response to the request message in step 705a.

Step 707a

The SGW 110 sends a modify bearer response message to the MME 108. The response message is a response message to the request message in step 704a. The response message indicates that the bearer has been modified, as requested.

Step 708a

The MME 108 sends a tracking area update accept message to the UE 101 indicating that the tracking area update request message has been received. The accept message is a response to the request message in step 702a.

Step 709a

The UE 101 sends a tracking area update complete message to the MME 108. The tracking area update complete message is a response to the tracking area update accept message in step 708a. The tracking area update complete message acknowledges that the tracking area update accept message has been received by the UE 101.

The intra TAU procedure without SGW change will now be described with reference to FIG. 7b using the communications system in FIGS. 2a, 2b and 4 as a reference. The method seen in FIG. 7b comprises at least some of the following steps, which steps may as well be carried out in another suitable order than described below.

Step 701b

The UE 101 sends a TAU request message to the cEPC node 205.

Step 702b

As a result of receiving the TAU request message, the cEPC node 205 updates the user plane. The user plane may be an internal user plane or a distributed user plane using the UPCF node 206 and the uEPC node 208.

Step 703b

The cEPC node 205 sends a TAU accept message to the UE 101.

Step 704b

The UE 101 sends a TAU complete message to the cEPC node 205.

When comparing FIG. 7a and FIG. 7b, FIG. 7a comprises nine steps and FIG. 7b comprises four steps. The steps in the dotted box (step 704a-707a) in FIG. 7a are not performed in step 7b. Thus, with the cEPC node 205, the amount of signaling is reduced in the intra TAU procedure without SGW change in FIG. 7b.

Figure 8A:
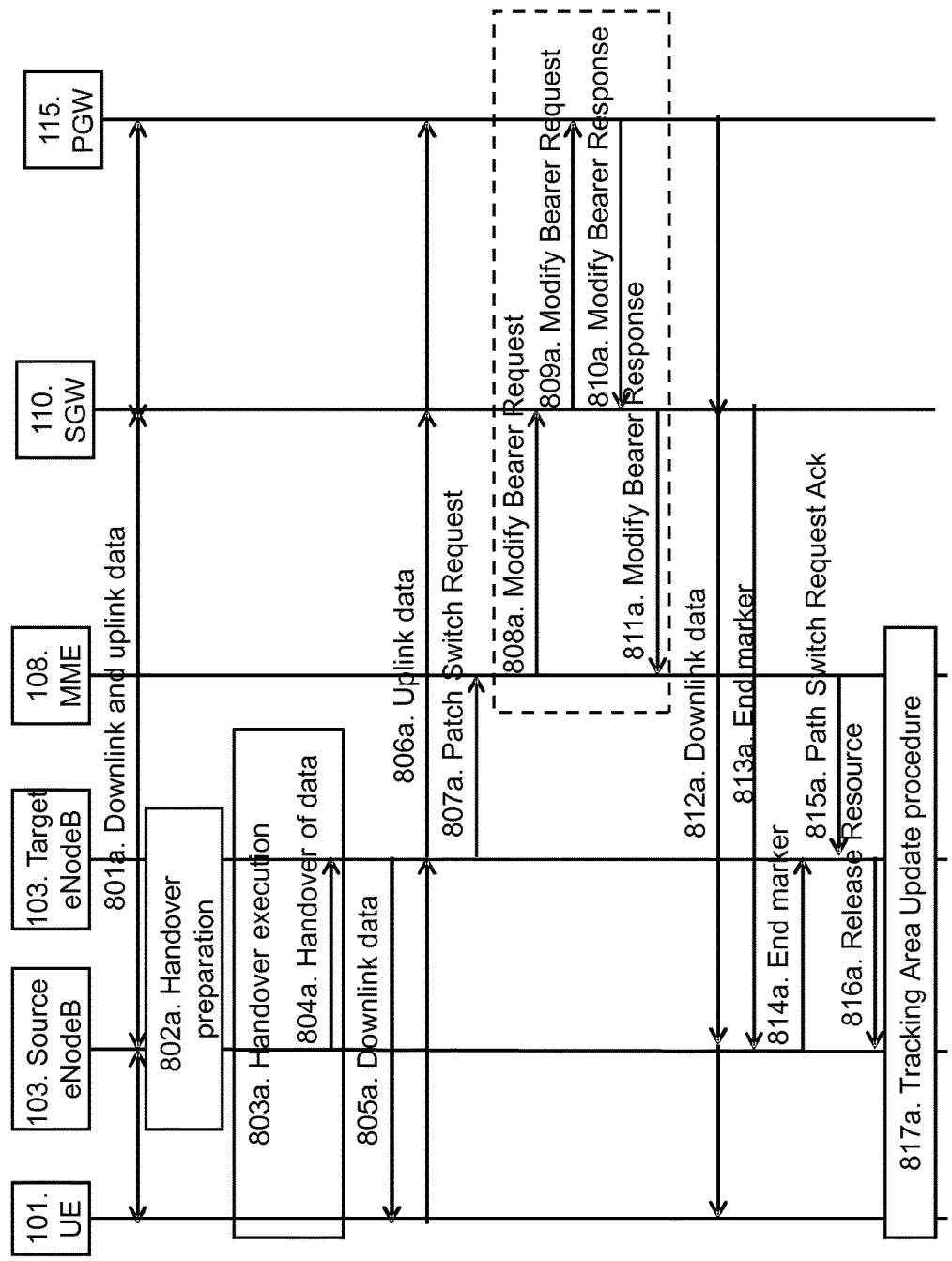
FIG. 8a is a signaling diagram illustrating embodiments of a legacy X2-handover procedure without a SGW change.
Figure 8B:
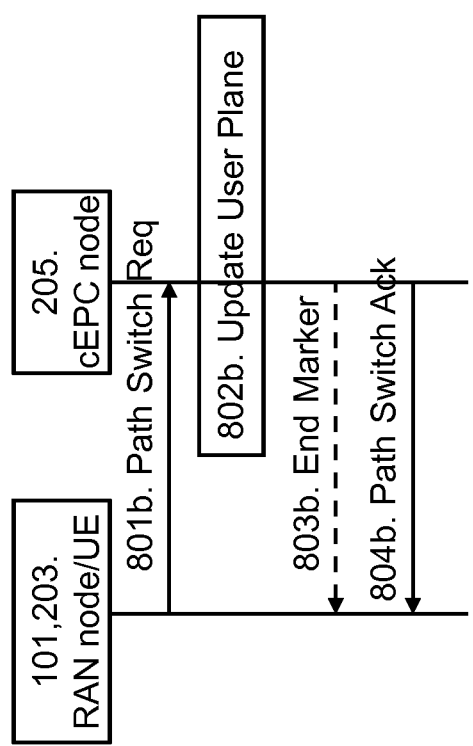
FIG. 8b is a signaling diagram illustrating embodiments of an X2-handover procedure without a SGW change.

The method for handling control plane signaling according to some embodiments will now be described with reference to the signaling diagrams in FIGS. 8a and 8b. In particular, FIG. 8a shows an example embodiment of an X2-handover procedure without SGW change with reference to FIGS. 1 and 3. FIG. 8b shows an example embodiment of an X2-handover procedure without SGW change with reference to FIGS. 2a, 2b and 4. The UE 101 is to be handed over from a source eNodeB 103 to a target eNodeB 103. X2 may be the name of the interface between the two eNodeB's 103.

Starting with FIG. 8a, the method in FIG. 8a illustrating the X2-Handover procedure without a SGW change comprises at least some of the following steps, which steps may as well be carried out in another suitable order than described below. Note that the dotted box in FIG. 8a will be described later with reference to FIG. 8b. The procedure seen in FIG. 8a may also be referred to as a legacy procedure.

Step 801a

Downlink and uplink data is transmitted between the UE 101 and the source eNodeB 103 via the SGW 110 and the PGW 115.

Step 802a

Handover preparation is performed between the source and target eNodeB 103 using the X2 interface.

Step 803a

The handover of the UE 101 from the source eNodeB 103 to the target eNodeB 103 is executed.

Step 804a

The source eNodeB 103 hands over data associated with the UE 101 to the target eNodeB 103.

Step 805a

The target eNodeB 103 sends downlink data to the UE 101.

Step 806a

The UE 101 sends uplink data to the target eNodeB 103 via the SGW 110 and the PGW 115.

Step 807a

The target eNodeB 103 sends a path switch request message to the MME 108. With the path switch request message, the target eNodeB 103 informs the MME 108 that the UE 101 has changed cell. Based on the path switch request message, the MME 108 may decide whether SGW relocation is required or not. In this example embodiment, SGW relocation is not required.

Step 808a

The MME 108 sends a modify bearer request message to the SGW 110.

Step 809a

The SGW 110 may send a modify bearer request message to the PGW 115. When the PGW 115 receives the request message, the PGW 115 modifies the barer, as requested.

Step 810a

When the PGW 115 has modified the bearer, the PGW 115 sends a modify bearer response message to the SGW 110. The response message is a response to the request message in step 809a and indicates that the bearer has been modified.

Step 811a

The SGW 110 sends a modify bearer response message to the MME 108. The response message is a response to the request message in step 808a. The response message indicates that the bearer has been modified.

Step 812a

The source eNodeB 103 sends downlink data to the UE 101 via the PGW 115 and the SGW 110.

Step 813a

The SGW 110 sends an end marker to the source eNodeB 103. The end marker may be an indication which indicates that the old SGW 110 is finished with all downlink payload packets. Such indication may be necessary to send to the source enodeB 103 to comply with 3GPP from a RAN node 203 perspective.

Step 814a

The source eNodeB 103 forwards the end marker to the target eNodeB 103. The end marker may be an indication which indicates that the old SGW 110 is finished with all downlink payload packets. Such indication may be necessary to send to the source enodeB 103 to comply with 3GPP from a RAN node 203 perspective.

Step 815a

The MME 108 sends a path switch request acknowledgement to the target eNodeB 103. The acknowledgement is sent in response to the request message in step 807a and indicates that the request message has been received and that the requested path switch has been performed.

Step 816a

The target eNodeB 103 sends a release resource message to the source eNodeB 103. The release resource message indicates to the source eNodeB 103 that it should release its resources related to the UE 101. As a result, the source eNodeB 103 releases the resources related to the UE 101. Thus, the UE 101 has been handed over from the source eNodeB 103 to the target eNodeB 103.

Step 817a

The tracking area update procedure is performed after step 816a has been completed. An example of such procedure is illustrated in FIG. 7a.

The X2-handover procedure without SGW change will now be described with reference to FIG. 8b using the communications system in FIGS. 2a, 2b and 4 as a reference. The method seen in FIG. 8b comprises at least some of the following steps, which steps may as well be carried out in another suitable order than described below.

Step 801b

The RAN node 202 sends a path switch request message to the cEPC node 205.

Step 802b

When the cEPC node 205 receives the path switch request message, the cEPC node 205 updates the user plane. The user plane may an internal user plane or a distributed user plane using the UPCF node 206 and the uEPC node 208.

Step 803b

The cEPC node 205 sends an end marker to the RAN node 203. The end marker may be an indication which indicates that the old SGW 110 is finished with all downlink payload packets. Such indication may be necessary to send to the source enodeB 103 to comply with 3GPP from a RAN node 203 perspective.

Step 804b

The cEPC node 205 sends a path switch acknowledgement message to the RAN node 203. The path switch acknowledgement message is sent in response to the request message in step 801b. The acknowledgement message indicates that the request message has been received and that the requested path switch has been performed.

When comparing FIG. 8a and FIG. 8b, it is seen that the steps in the dotted box (step 808a-811a) in FIG. 8a are not performed in step 8b. Thus, with the cEPC node 205, the amount of signaling is reduced in the X2-handover procedure without SGW change in FIG. 8b compared to FIG. 8a.

Figure 9A:
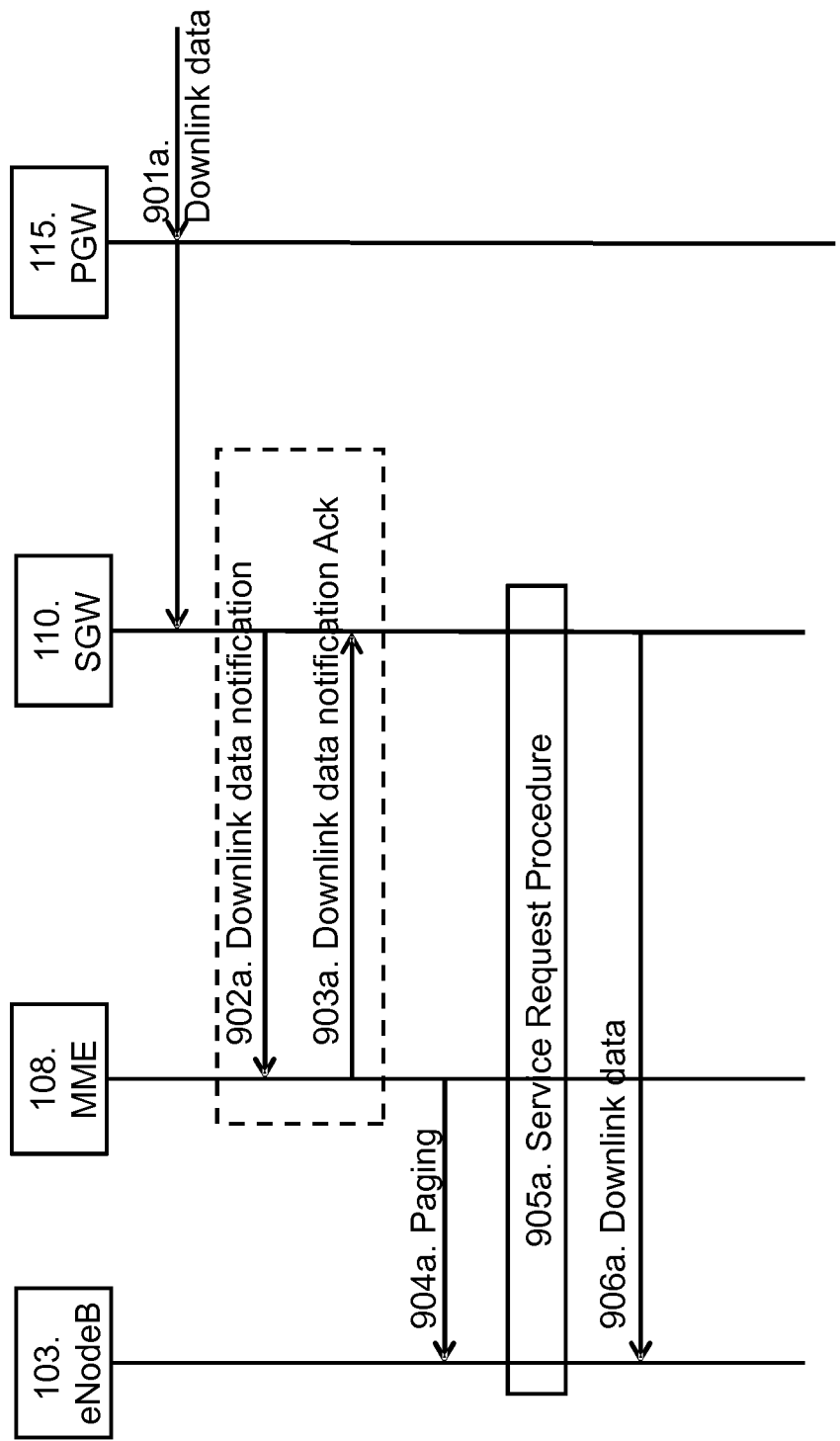
FIG. 9a is a signaling diagram illustrating embodiments of a legacy service request procedure initiated by the network.
Figure 9B:
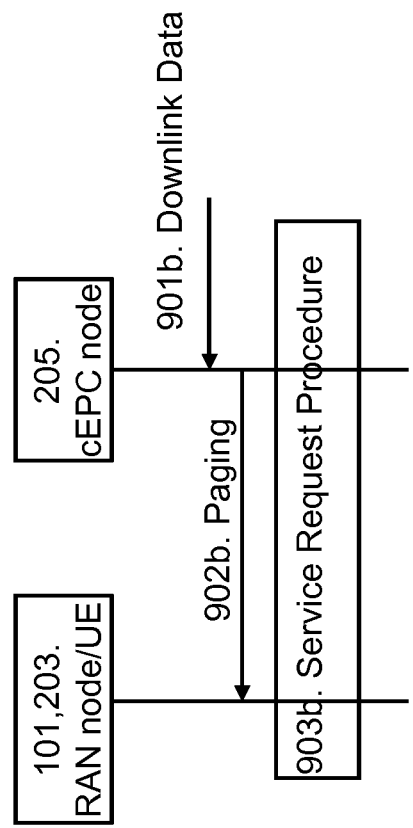
FIG. 9b is a signaling diagram illustrating embodiments of a service request procedure initiated by the network.

The method for handling control plane signaling according to some embodiments will now be described with reference to the signaling diagrams in FIGS. 9a and 9b. In particular, FIG. 9a shows an example embodiment of an attach procedure initiated by the network with reference to FIGS. 1 and 3. FIG. 9b shows an example embodiment of an attach procedure initiated by the network with reference to FIGS. 2a, 2b and 4.

Starting with FIG. 9a, the method in FIG. 9a illustrating the attach procedure comprises at least some of the following steps, which steps may as well be carried out in another suitable order than described below. Note that the dotted box in FIG. 9a will be described later with reference to FIG. 9b. The procedure seen in FIG. 9a may also be referred to as a legacy procedure.

Step 901a

The network sends downlink data to the SGW 110 via the PGW 115. The network may be represented by e.g. the Internet and the downlink data may be e.g. an instant message.

Step 902a

The SGW 110 sends a downlink data notification message to the MME 108.

Step 903a

When the MME 108 has received the downlink data notification message, the MME 108 sends a downlink data notification acknowledgement message to the SGW 110. The acknowledgement message indicates that the MME 108 has received the notification in step 902a.

Step 904a

The MME 108 sends a paging message to the eNodeB 103.

Step 905a

A service request procedure is performed. The service request procedure may be the same procedure as described in FIG. 6a above.

Step 906a

The SGW 110 sends the downlink data from step 901a down to the eNodeB 103 for further transmission to the UE 101.

The service request procedure initiated by the network will now be described with reference to FIG. 9b using the communications system in FIGS. 2a, 2b and 4 as a reference. The method seen in FIG. 9b comprises at least some of the following steps, which steps may as well be carried out in another suitable order than described below.

Step 901b

The cEPC node 205 receives downlink data from the network. The downlink data is to be transmitted to the UE 101.

Step 902b

The cEPC node 205 sends a paging message to the RAN node 203.

Step 903b

The service request procedure is performed.

When comparing FIG. 9a and FIG. 9b, the steps in the dotted box (step 902a-903a) in FIG. 9a are not performed in step 9b. Thus, with the cEPC node 205, the amount of signaling is reduced in the service procedure initiated by the network in FIG. 9b compared to FIG. 9a.

The method for handling control plane signaling according to some embodiments will now be described with reference to the signaling diagrams in FIGS. 10a and 10b. In particular, FIG. 10a shows an example embodiment of a phase 2 of an attach procedure with reference to FIGS. 1 and 3. FIG. 10b shows an example embodiment of phase 2 of an attach procedure with reference to FIGS. 2a, 2b and 4. Phase 2 relates to home subscribers using the PCRF 130.

Starting with FIG. 10a, the method in FIG. 10a illustrating the attach procedure comprises at least some of the following steps, which steps may as well be carried out in another suitable order than described below. Note that the dotted box in FIG. 10a will be described later with reference to FIG. 10b. The procedure seen in FIG. 10a may also be referred to as a legacy procedure. FIG. 10a involves the PCRF 130 and the Gx interface. Some steps of FIG. 10a are equivalent to some steps of FIG. 5a and will therefore not be repeated here for the sake of simplicity.

Step 1001a-1003a

These steps correspond to steps 501a-503a in FIG. 5a and steps 1201a-1203a in FIG. 12a.

Step 1004a

This step corresponds to step 1204a in FIG. 12a. A PCEF initiated IP-CAN session termination procedure is executed between the PGW 115 and the PCRF 130. In other words, the session is deleted, as requested.

Steps 1005a-1007a

These steps correspond to steps 504a-506a in FIG. 5a and step 1205a-1207a in FIG. 12a.

Step 1008a

This step corresponds to step 1208a in FIG. 12a. An IP-CAN session establishment/modification procedure is executed between the PGW 115 and the PCRF 130. In other words, the session is created, as requested by the message in step 1007a.

Step 1009a-1020a

These steps correspond to steps 507a-518a in FIG. 5a and steps 1209a-1220a in FIG. 12a.

The phase 2 of the attach procedure will now be described with reference to FIG. 10b using the communications system in FIGS. 2a, 2b and 4 as a reference. The method seen in FIG. 10b comprises at least some of the following steps, which steps may as well be carried out in another suitable order than described below. FIG. 10b involves the policy node 230. Some steps of FIG. 10b are equivalent to some steps of FIG. 5b and will therefore not be repeated here for the sake of simplicity.

Step 1001b

This step corresponds to step 501b in FIG. 5b.

Step 1002b

The cEPC node 205 sends a credit control request message to the policy node 230. As a result, the policy node 230 performs a credit control, as requested.

Step 1003b

When the policy node 203 has performed the credit control, the policy node 203 sends a credit control answer message to the cEPC node 205.

Step 1004a-1009b

These steps correspond to steps 502b-507b in FIG. 5b.

When comparing FIG. 10a and FIG. 10b, the steps in the dotted boxes (step 1003a-1011a and 1016a-1019a) in FIG. 10a are not performed in step 10b. Thus, with the cEPC node 205, the amount of signaling is reduced in the attach procedure in FIG. 10b compared to FIG. 10a.

The method for handling control plane signaling according to some embodiments will now be described with reference to the signaling diagrams in FIGS. 11a and 11b. In particular, FIG. 11a shows an example embodiment of a service request procedure initiated by the UE 101 with reference to FIGS. 1 and 3. FIG. 11b shows an example embodiment of a service request procedure initiated by the UE 101 with reference to FIGS. 2a, 2b and 4.

Starting with FIG. 11a, the method in FIG. 11a illustrating the attach procedure comprises at least some of the following steps, which steps may as well be carried out in another suitable order than described below. Note that the dotted box in FIG. 11a will be described later with reference to FIG. 11b. The procedure seen in FIG. 11a may also be referred to as a legacy procedure. Some steps of FIG. 11a are equivalent to some steps of FIG. 6a and will therefore not be repeated here for the sake of simplicity.

Step 1101a-1105a

These steps correspond to steps 601a-605a in FIG. 6a.

Step 1106a

A PCEF initiated IP-CAN session modification procedure is executed between the PGW 115 and the PCRF 130. In other words, the PGW 115 modifies the bearer, as requested.

Step 1107a-1108a

These steps correspond to steps 607a and 608a in FIG. 6a.

The service request procedure initiated by the UE 101 will now be described with reference to FIG. 11b using the communications system in FIGS. 2a, 2b and 4 as a reference. The method seen in FIG. 11b comprises at least some of the following steps, which steps may as well be carried out in another suitable order than described below. Some steps of FIG. 11b are equivalent to some steps of FIG. 6b and will therefore not be repeated here for the sake of simplicity.

Step 1101b-1103b

These steps correspond to steps 601b-603b in FIG. 6b.

Step 1104b

The cEPC node 205 sends a credit control request message to the policy node 230. The policy node 230 performs the requested credit control and sends a credit control response answer message back to the cEPC node 205.

Step 1105b

This step corresponds to step 604b in FIG. 6b.

When comparing FIG. 11a and FIG. 11b, the steps in the dotted boxes (step 11104a-11108a) in FIG. 11a are not performed in step 11b. Thus, with the cEPC node 205, the amount of signaling is reduced in the service request procedure initiated by the UE 101 in FIG. 11b compared to FIG. 11a.

The method for handling control plane signaling according to some embodiments will now be described with reference to the signaling diagrams in FIGS. 12a and 12b. In particular, FIG. 12a shows an example embodiment of a phase 3 of an attach procedure with roaming and when the UE 101 is routed to its home network with reference to FIGS. 1 and 3. FIG. 12b shows an example embodiment of phase 3 of the attach procedure with roaming and when the UE 101 is routed to its home network with reference to FIGS. 2a, 2b and 4. Phase 3 relates to roaming subscribers, e.g. UEs.

Starting with FIG. 12a, the method in FIG. 12a illustrating the attach procedure comprises at least some of the following steps, which steps may as well be carried out in another suitable order than described below. Note that the dotted boxes in FIG. 12a will be described later with reference to FIG. 12b. The procedure seen in FIG. 12a may also be referred to as a legacy procedure. Some steps of FIG. 12a are equivalent to some steps of FIGS. 5a and 10a and will therefore not be repeated here for the sake of simplicity.

Step 1201a-1203a

These steps correspond to steps 501a-503a in FIG. 5a and steps 1001a-1003a in FIG. 10a.

Step 1204a

This step corresponds to step 1004a in FIG. 10a.

Step 1205a-1207a

These steps correspond to steps 504a-506a in FIG. 5a and steps 1005a-1007a in FIG. 10a.

Step 1208a

This step corresponds to step 1008a in FIG. 10a.

Step 1209a-12120a

These steps correspond to steps 507a-518a in FIG. 5a and steps 1009a-1020a in FIG. 10a.

The attach procedure when the UE 101 is roaming and home routed will now be described with reference to FIG. 12b using the communications system in FIGS. 2a, 2b and 4 as a reference. The method seen in FIG. 12b comprises at least some of the following steps, which steps may as well be carried out in another suitable order than described below. Some steps of FIG. 12b are equivalent to some steps of FIGS. 5b and 10b and will therefore not be repeated here for the sake of simplicity.

Steps 1201b-1203b

These steps correspond to steps 501b-503b in FIG. 5b and steps 1001b, 1004b and 1005b in FIG. 10b Step 1204b The cEPC node 205 sends a create session request message to the PGW 115 and the PGW 115 responds with a create session response message to the cEPC node 205. Since FIG. 12b illustrates a roaming scenario, the PGW 115 is not necessarily a function included in the cEPC node 205 but it may be a standalone gateway node instead.

Step 1205b-1208b

These steps correspond to steps 504b-507b in FIG. 5b and steps 1006b-1009b in FIG. 10b.

When comparing FIG. 12a and FIG. 12b, the steps in the dotted boxes (steps 1203a-1211a and steps 1216a-1219a) in FIG. 12a are not performed in step 12b. Thus, with the cEPC node 205, the amount of signaling is reduced in the attach procedure in FIG. 12b compared to FIG. 12a.

Figure 13A:
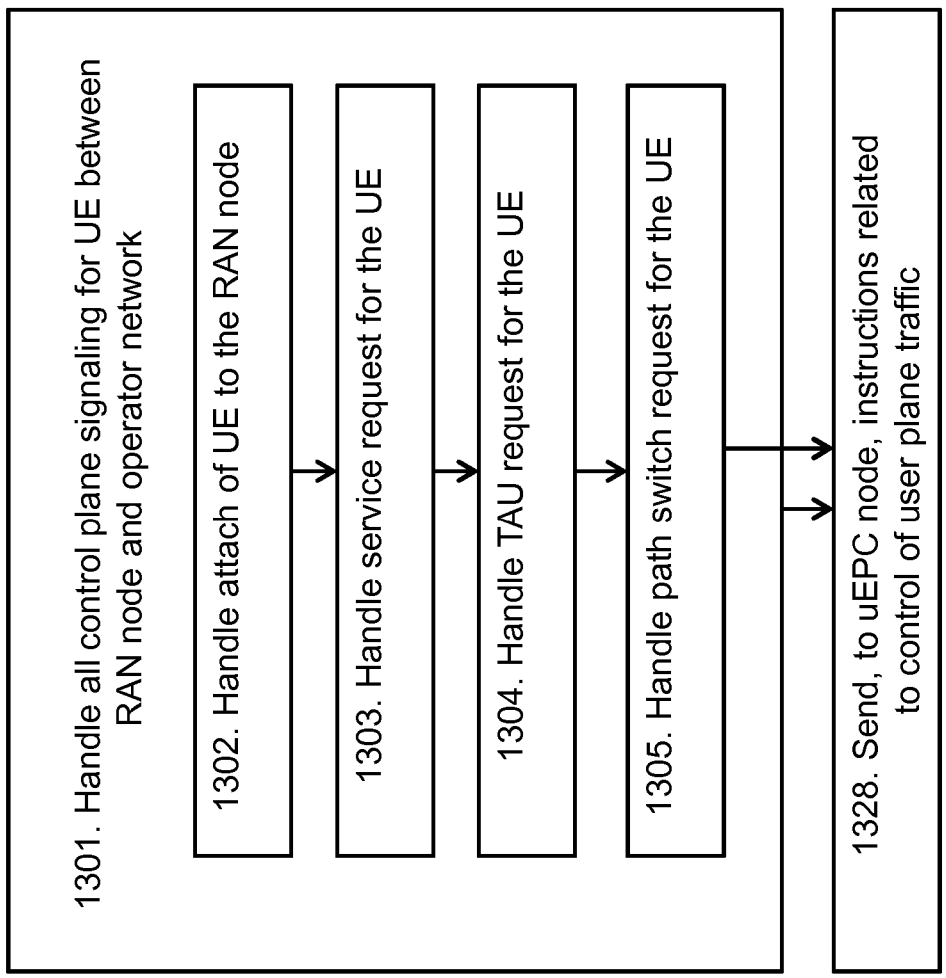
FIG. 13a-d are flow charts illustrating embodiments of a method.
Figure 13B:
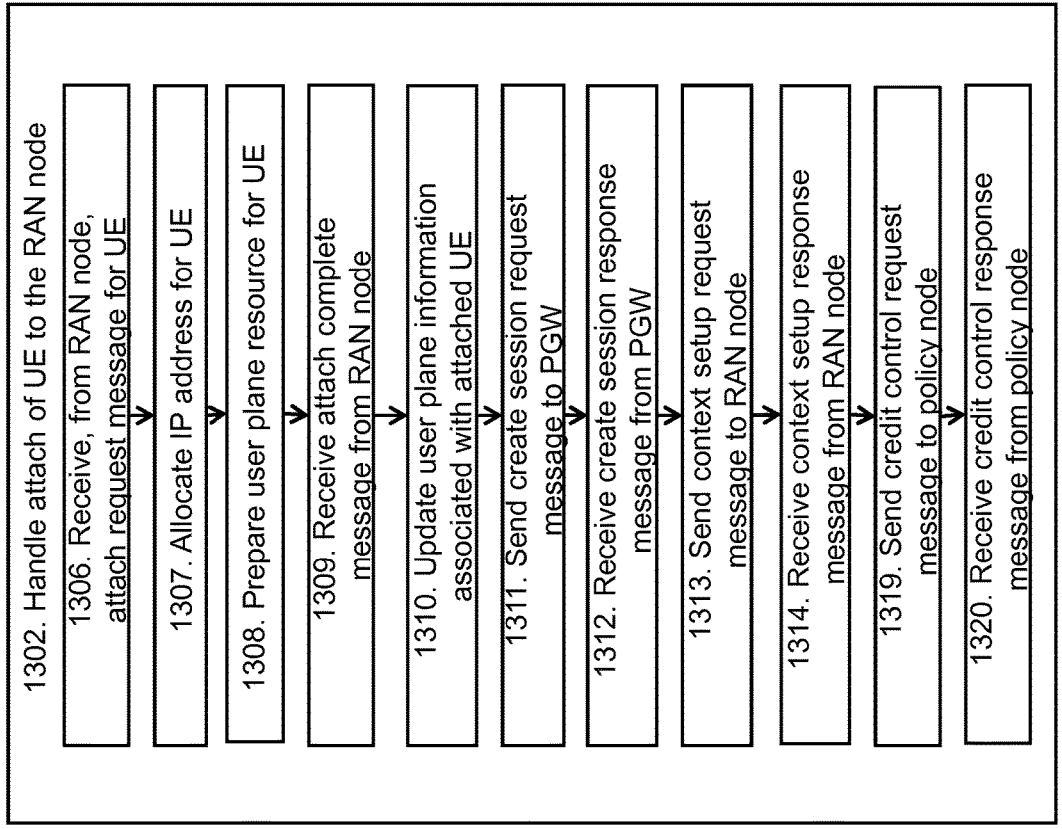
Figure 13C:
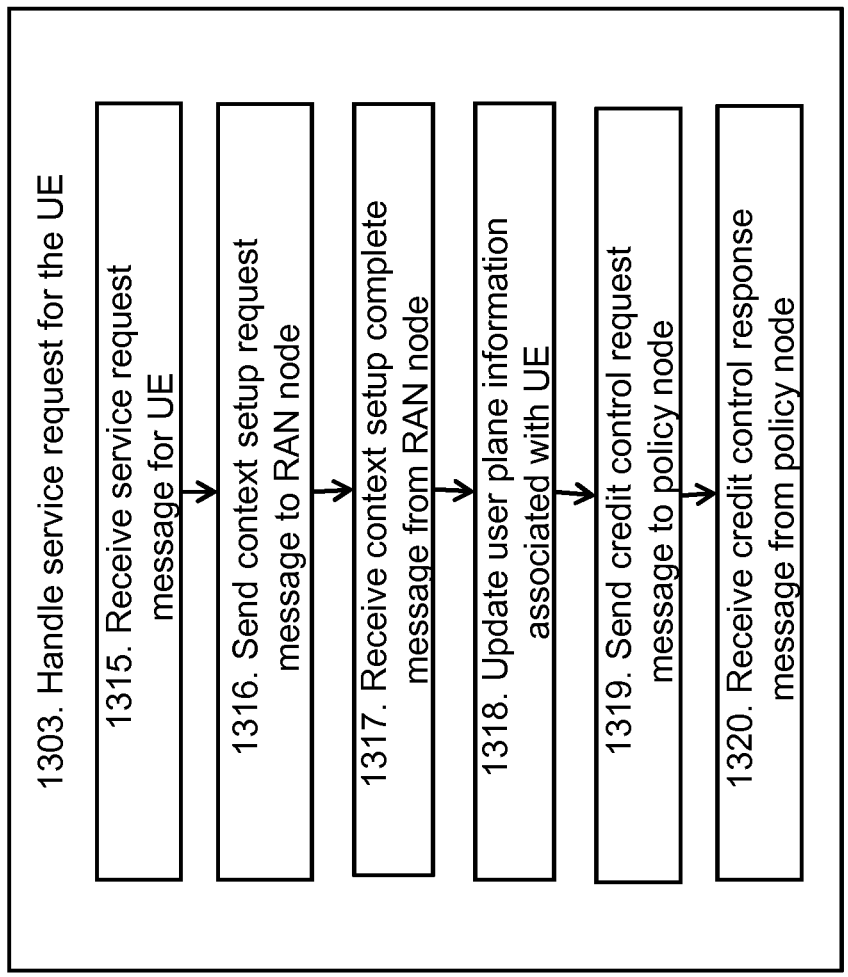
Figure 13D:
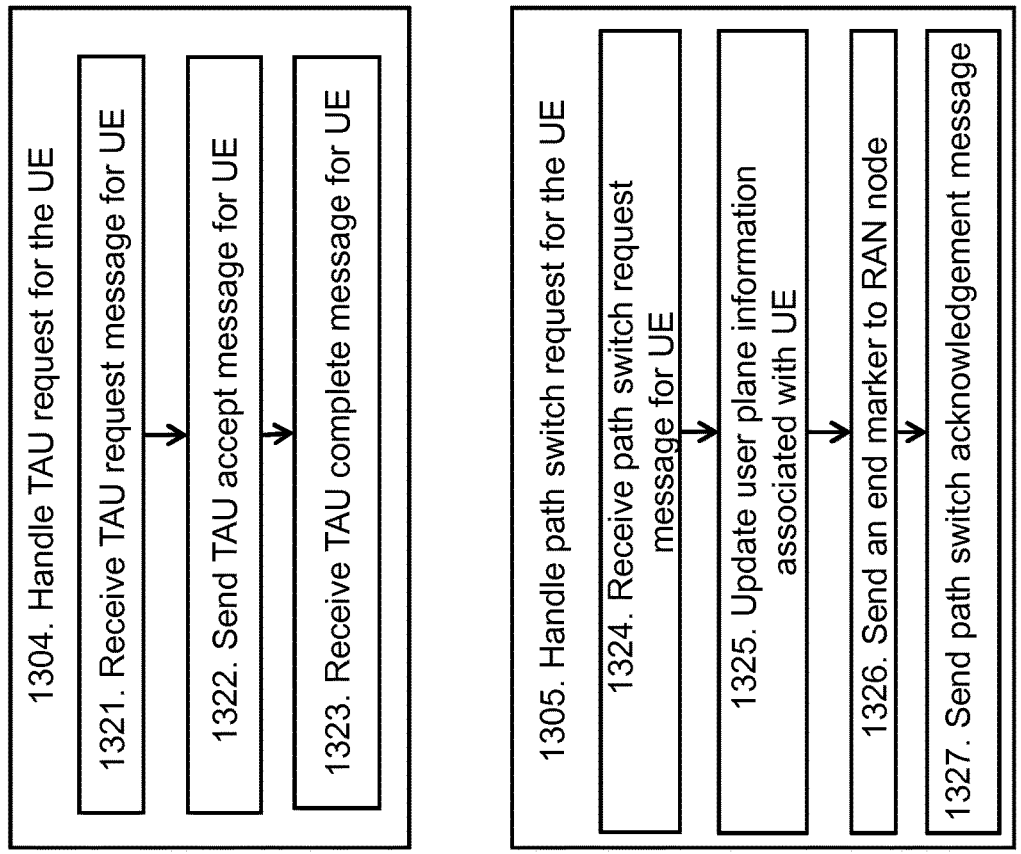

The method described above will now be described seen from the perspective of the cEPC node 205. FIGS. 13a-d are flowcharts describing the present method in the cEPC node 205, for handling control plane signaling in a communications system 200. FIG. 13a illustrates steps 1301-1305 and 1328, FIG. 13b illustrates steps 1302, 1306-1314 and 1319-1320, FIG. 13c illustrates steps 1303 and 1315-1320 and FIG. 13d illustrates steps 1304, 1305, 1321-1323 and 1324-1327. The method comprises at least some of the following steps to be performed by the cEPC node 205, which steps may be performed in any suitable order than described below:

Step 1301

This step is seen in FIG. 13*a*. The cEPC node 205 handles substantially all or all control plane signaling for a UE 101 between a RAN node 203 and an operator network 218.

Step 1302

This step is seen in FIGS. 13*a* and 13*b*. This step may be seen as a substep of step 1301. This step corresponds to at least some of the steps 501*b*, 502*b*, 503*b*, 504*b*, 505*b*, 506*b* and 507*b* in FIG. 5*b*, steps 1001*b*, 1002*b*, 1003*b*, 1004*b*, 1005*b*, 1006*b*, 1007*b*, 1008*b* and 1009*b* in FIG. 10*b* and steps 1201*b*, 1202*b*, 1203*b*, 1204*b*, 1205*b*, 1206*b*, 1207*b* and 1208*b* in FIG. 12*b*. In some embodiments, the cEPC node 205 handles attach of the UE 101 to the RAN node 203.

Step 1303

This step is seen in FIGS. 13*a* and 13*c*. This step may be seen as a substep of step 1301. This step corresponds to at least some of the steps 601*b*, 602*b*, 603*b* and 604*b* in FIG. 6*b*, steps 901*b*, 902*b* and 903*b* in FIG. 9*b* and steps 1101*b*, 1102*b*, 1103*b*, 1104*b* and 1105*b* in FIG. 11*b*. In some embodiments, the cEPC node 205 handles a service request for the UE 101.

The service request may be initiated by downlink data to be transmitted to the UE 101 or by a request for a service from the UE 101.

Step 1304

This step is seen in FIGS. 13*a* and 13*d*. This may be seen as a substep of step 1301. This step corresponds to at least some of the steps 701*b*, 702*b*, 703*b* and 704*b* in FIG. 7*b*. In some embodiments, the cEPC node 205 handles a TAU request for the UE 101.

Step 1305

This step is seen in FIGS. 13*a* and 13*d*. This may be seen as a substep of step 1301. This step corresponds to at least some of the steps 801*b*, 802*b*, 803*b* and 804*b* in FIG. 8*b*. In some embodiments, the cEPC node 205 handles a path switch request for the UE 101. In some embodiments, the path switch may be referred to as an X2-handover procedure which is a handover from one RAN node 203 to another RAN node 203.

Step 1306

This step is seen in FIG. 13*b*. This step may be seen as a substep of step 1302. This step corresponds to at least some of the steps 501*b* in FIG. 5*b*, step 1001*b* in FIG. 10*b* and step 1201*b* in FIG. 12*b*. In some embodiments, the cEPC node 205 receives, from the RAN node 203, an attach request message for the UE 101. The attach request message is a request for attach to the RAN node 203.

Step 1307

This step is seen in FIG. 13*b*. This step may be seen as a substep of step 1302. This step corresponds to at least some of the steps 502*b* in FIG. 5*b*, step 1004*b* in FIG. 10*b* and step 1202*b* in FIG. 12*b*. In some embodiments, the cEPC node 205 allocates an IP address for the UE 101.

Step 1308

This step is seen in FIG. 13*b*. This step may be seen as a substep of step 1302. This step corresponds to at least some of the steps 503*b* in FIG. 5*b*, step 1005*b* in FIG. 10*b* and step 1203*b* in FIG. 12*b*. In some embodiments, the cEPC node 205 prepares at least one user plane resource for the UE 101.

Step 1309

This step is seen in FIG. 13*b*. This step may be seen as a substep of step 1302. This step corresponds to at least some of the steps 506*b* in FIG. 5*b*, step 1008*b* in FIG. 10*b* and step 1207*b* in FIG. 12*b*. In some embodiments, the cEPC node 205 receives an attach complete message from the RAN node 203. The attach complete message indicates that attach of the UE 101 to the RAN node 203 is completed.

Step 1310

This step is seen in FIG. 13*b*. This step may be seen as a substep of step 1302. This step corresponds to at least some of the steps 507*b* in FIG. 5*b*, step 1009*b* in FIG. 10*b* and step 1208*b* in FIG. 12*b*. In some embodiments, the cEPC node 205 updates user plane information associated with the attached UE 101 based on the attach request.

Step 1311

This step is seen in FIG. 13*b*. This step may be seen as a substep of step 1302. This step corresponds to step 1204*b* in FIG. 12*b*. In some embodiments, the cEPC node 205 sends a create session request message to a PGW 115.

Step 1312

This step is seen in FIG. 13*b*. This step may be seen as a substep of step 1302. This step corresponds to step 1204*b* in FIG. 12*b*. In some embodiments, the cEPC node 205 receives a create session response message from the PGW 115.

Step 1313

This step is seen in FIG. 13*b*. This step may be seen as a substep of step 1302. This step corresponds to step 1205*b* in FIG. 12*b*. In some embodiments, the cEPC node 205 sends a context setup request message to the RAN node 203.

Step 1314

This step is seen in FIG. 13*b*. This step may be seen as a substep of step 1302. This step corresponds to step 1206*b* in FIG. 12*b*. In some embodiments, the cEPC node 205 receives a context setup response message from the RAN node 203.

Step 1315

This step is seen in FIG. 13*c*. This step may be seen as a substep of step 1303. This step corresponds to at least one of step 601*b* in FIG. 6*b* and step 1101*b* in FIG. 11*b*. In some embodiments, the cEPC node 205 receives, from the RAN node 203, a service request message for the UE 101.

Step 1316

This step is seen in FIG. 13*c*. This step may be seen as a substep of step 1303. This step corresponds to at least one of step 602*b* in FIG. 6*b* and step 1102*b* in FIG. 11*b*. In some embodiments, the cEPC node 205 sends a context setup request message to the RAN node 203.

Step 1317

This step is seen in FIG. 13*c*. This step may be seen as a substep of step 1303. This step corresponds to at least one of step 603*b* in FIG. 6*b* and step 1103*b* in FIG. 11*b*. In some embodiments, the cEPC node 205 receives a context setup complete message from the RAN node 203.

Step 1318

This step is seen in FIG. 13*c*. This step may be seen as a substep of step 1303. This step corresponds to at least one of step 604*b* in FIG. 6*b* and step 1105*b* in FIG. 11*b*. In some embodiments, the cEPC node 205 updates the user plane information associated with the UE 101 based on the service request.

Step 1319

This step is seen in FIGS. 13*b* and 13*c*. This may be seen as a substep of step 1302 or as a substep of step 1303 or as a substep of step 1302 and 1303. This step corresponds to at least one of steps 1002*b* in FIG. 10*b* and step 1104*b* in FIG. 11*b*. In some embodiments, the cEPC node 205 sends a credit control request message to a policy node 230.

Step 1320

This step is seen in FIGS. 13*b* and 13*c*. This may be seen as a substep of step 1302 or as a substep of step 1303 or as a substep of step 1302 and 1303. This step corresponds to at least one of steps 1003*b* in FIG. 10*b* and step 1104*b* in FIG.

11b. In some embodiments, the cEPC node 205 receives a credit control response message from the policy node 230.

Step 1321

This step is seen in FIG. 13d. This may be seen as a substep of step 1304. This step corresponds to step 701b in FIG. 7b. In some embodiments, the cEPC node 205 receives, from the RAN node 203, a TAU request message for the UE 101.

Step 1322

This step is seen in FIG. 13d. This may be seen as a substep of step 1304. This step corresponds to step 703b in FIG. 7b. In some embodiments, the cEPC node 205 sends, to the RAN node 203, a TAU accept message for the UE 101.

Step 1323

This step is seen in FIG. 13d. This may be seen as a substep of step 1304. This step corresponds to step 704b in FIG. 7b. In some embodiments, the cEPC node 205 receives, from the RAN node 203, a TAU complete message for the UE 101.

Step 1324

This step is seen in FIG. 13d. This may be seen as a substep of step 1305. This step corresponds to step 801b in FIG. 8b. In some embodiments, the cEPC node 205 receives, from the RAN node 203, a path switch request message for the UE 101.

Step 1325

This step is seen in FIG. 13d. This may be seen as a substep of step 1305. This step corresponds to step 802b in FIG. 8b. In some embodiments, the cEPC 205 updates user plane information associated with the UE 101 based on the path switch request message.

Step 1326

This step is seen in FIG. 13d. This may be seen as a substep of step 1305. This step corresponds to step 803b in FIG. 8b. In some embodiments, the cEPC 205 sends an end marker to the RAN node 203.

Step 1327

This step is seen in FIG. 13d. This may be seen as a substep of step 1305. This step corresponds to step 804b in FIG. 8b. In some embodiments, the cEPC 205 sends, to the RAN node 203, a path switch acknowledgement message for the UE 101.

Step 1328

This step is seen in FIG. 13a. In some embodiments, the cEPC node 205 sends, to the uEPC node 208, instructions related to control of user plane traffic.

The cEPC node 205 may be connected to a UPCF node 206 configured to send instructions related to control of user plane traffic to the uEPC node 208. The cEPC node 205 may be scalable per UE 101. The cEPC node 205 may be connected to the uEPC node 208 through service chaining. A change in the cEPC node 205 may be made without affecting the uEPC node 208. The cEPC node 205 may be configured to perform at least some of an MME function, a SGW function and a PGW function.

Figure 14:
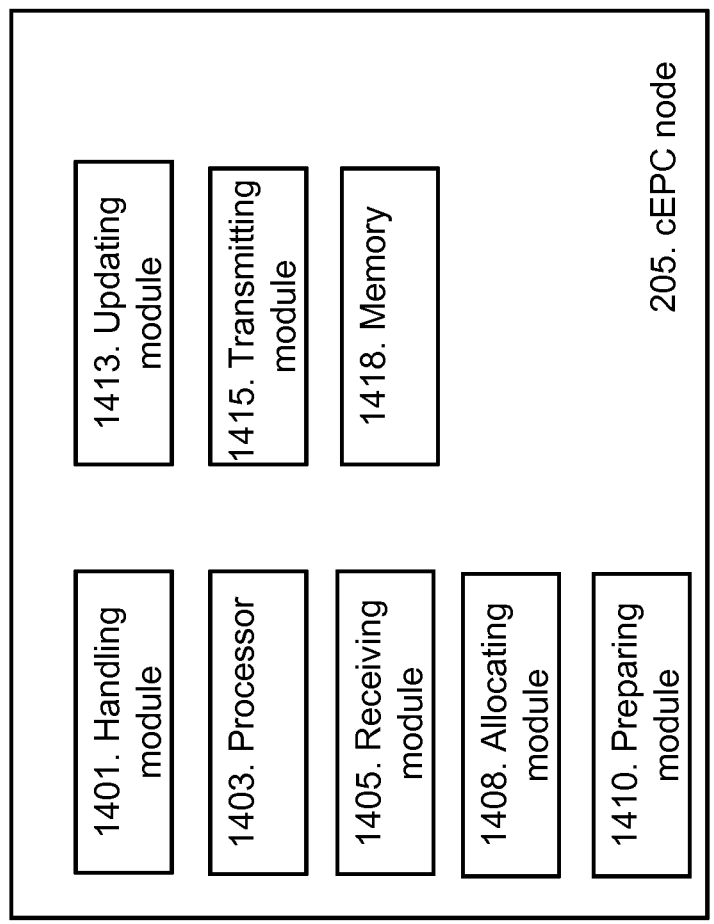
FIG. 14 is a schematic block diagram illustrating embodiments of a cEPC node.

FIG. 14 illustrates embodiments of the cEPC node 205 configured to perform the method actions for handling control plane signaling in a communications system 200, as described above in relation to FIGS. 5a-13a-d.

The cEPC node 205 is configured to, e.g. by means of a handling module 1401 configured to handle substantially all or all control plane signaling for the UE 101 between the RAN node 203 and an operator network 218. The handling module 1401 may also be referred to as a handling unit, a handling means, a handling circuit, means for handling etc. The handling module 1401 may be a processor 1403 of the cEPC node 205.

In some embodiments, the cEPC node 205 is further configured to, e.g. by means of the handling module 1401, handle attach of the UE 101 to the RAN node 203. In some embodiments, the cEPC node 205 is further configured to, e.g. by means of the handling module 1401, handle a service request for the UE 101. The service request may be initiated by downlink data to be transmitted to the UE 101 or by a request for a service from the UE 101. In some embodiments, the cEPC node 205 is further configured to, e.g. by means of the handling module 1401, handle a TAU request for the UE 101. In some embodiments, the cEPC node 205 is further configured to, e.g. by means of the handling module 1401, handle a path switch request for the UE 101.

In some embodiments, the cEPC node 205 is further configured to, e.g. by means of a receiving module 1405, receive, from the RAN node 203, an attach request message for the UE 101. The attach request message may be a request for attach to the RAN node 203. The receiving module 1405 may also be referred to as a receiving unit, a receiving means, a receiving circuit, means for receiving, input unit etc. The receiving module 1405 may be a receiver, a transceiver etc. The receiving module 1405 may be a wireless receiver of the cEPC node 205 of a wireless or fixed communications system.

In some embodiments, the cEPC node 205 is further configured to, e.g. by means of an allocating module 1408, allocate an IP address for the UE 101. The allocating module 1408 may also be referred to as an allocating unit, an allocating means, an allocating circuit, means for allocating etc. The allocating module 1408 may be the processor 1403 of the cEPC node 205.

In some embodiments, the cEPC node 205 is further configured to, e.g. by means of a preparing module 1410, prepare at least one user plane resource for the UE 101. The preparing module 1410 may also be referred to as a preparing unit, a preparing means, a preparing circuit, means for preparing etc. The preparing module 1410 may be the processor 1403 of the cEPC node 205.

In some embodiments, the cEPC node 205 is further configured to, e.g. by means of the receiving module 1405, receive an attach complete message from the RAN node 203. The attach complete message may indicate that attach of the UE 101 to the RAN node 203 is completed.

In some embodiments, the cEPC node 205 is further configured to, e.g. by means of an updating module 1413, update user plane information associated with the attached UE 101 based on the attach request. The updating module 1413 may also be referred to as an updating unit, an updating means, an updating circuit, means for updating etc. The updating module 1413 may be the processor 1403 of the cEPC node 205.

In some embodiments, the cEPC node 205 is further configured to, e.g. by means of a transmitting module 1415, send a create session request message to the PGW 115. The transmitting module 1415 may also be referred to as a transmitting unit, a transmitting means, a transmitting circuit, means for transmitting, output unit etc. The transmitting module 14015 may be a transmitter, a transceiver etc. The transmitting module 1415 may be a wireless transmitter of the cEPC node 205 of a wireless or fixed communications system.

In some embodiments, the cEPC node 205 is further configured to, e.g. by means of the receiving module 1405, receive a create session response message from the PGW 115.

In some embodiments, the cEPC node 205 is further configured to, e.g. by means of the transmitting module 1415, send a context setup request message to the RAN node 203.

In some embodiments, the cEPC node 205 is further configured to, e.g. by means of the receiving module 1405, receive a context setup response message from the RAN node 203.

In some embodiments, the cEPC node 205 is further configured to, e.g. by means of the receiving module 1405, receive, from the RAN node 203, a service request message for the UE 101.

In some embodiments, the cEPC node 205 is further configured to, e.g. by means of the transmitting module 1415, send a context setup request message to the RAN node 203.

In some embodiments, the cEPC node 205 is further configured to, e.g. by means of the receiving module 1405, receive a context setup complete message from the RAN node 203.

In some embodiments, the cEPC node 205 is further configured to, e.g. by means of the updating module 1413, update user plane information associated with the UE 101 based on the service request.

In some embodiments, the cEPC node 205 is further configured to, e.g. by means of the transmitting module 1415, send a credit control request message to a policy node 230.

In some embodiments, the cEPC node 205 is further configured to, e.g. by means of the receiving module 1405, receive a credit control response message from the policy node 230.

In some embodiments, the cEPC node 205 is further configured to, e.g. by means of the receiving module 1405, receive, from the RAN node 203, a TAU request message for the UE 101.

In some embodiments, the cEPC node 205 is further configured to, e.g. by means of the transmitting module 1415, send, to the RAN node 203, a TAU accept message for the UE 101.

In some embodiments, the cEPC node 205 is further configured to, e.g. by means of the receiving module 1405, receive, from the RAN node 203, a TAU complete message for the UE 101.

In some embodiments, the cEPC node 205 is further configured to, e.g. by means of the receiving module 1405, receive, from the RAN node 203, a path switch request message for the UE 101.

In some embodiments, the cEPC node 205 is further configured to, e.g. by means of the updating module 1413, update user plane information associated with the UE 101 based on the path switch request message, In some embodiments, the cEPC node 205 is further configured to, e.g. by means of the transmitting module 1415, send an end marker to the RAN node 203.

In some embodiments, the cEPC node 205 is further configured to, e.g. by means of the transmitting module 1415, send, to the RAN node 203, a path switch acknowledgement message for the UE 101.

In some embodiments, the cEPC node 205 is further configured to, e.g. by means of the transmitting module 1415, send, to a uEPC node 208, instructions related to control of user plane traffic.

The cEPC node 205 may be is connected to a UPCF node 206 configured to send instructions related to control of user plane traffic to a uEPC node 208. The cEPC node 205 may be scalable per UE 101. The cEPC node 205 may be connected to a uEPC node 208 through service chaining. A change in the cEPC node 205 may be made without affecting the uEPC, node 208. The cEPC node 205 may be configured to perform at least some of an MME function, a SGW function and a PGW function.

The cEPC node 205 may further comprise a memory 1418 comprising one or more memory units. The memory 1418 is arranged to be used to store data, received data streams, power level measurements, attach messages, service request messages, TAU messages, path switch messages, request messages, response messages, control plane associated information, user plane related information, threshold values, time periods, configurations, scheduling's, and applications to perform the methods herein when being executed in the cEPC node 205.

The present mechanism for handling control plane signaling in a communications system 200 may be implemented through one or more processors, such as a processor 1403 in the cEPC node arrangement depicted in FIG. 14, together with computer program code for performing the functions of the embodiments herein. The processor may be for example a Digital Signal Processor (DSP), Application Specific Integrated Circuit (ASIC) processor, Field-programmable gate array (FPGA) processor or microprocessor. The program code mentioned above may also be provided as a computer program product, for instance in the form of a data carrier carrying computer program code for performing the embodiments herein when being loaded into the cEPC node 205. One such carrier may be in the form of a CD ROM disc. It is however feasible with other data carriers such as a memory stick. The computer program code can furthermore be provided as pure program code on a server and downloaded to the cEPC node 205.

Those skilled in the art will also appreciate that the handling module 1401, the receiving module 1405, the allocating module 1408, the preparing module 1410, the updating module 1413 and the transmitting module 1415 described above may refer to a combination of analog and digital circuits, and/or one or more processors configured with software and/or firmware, e.g. stored in a memory, that when executed by the one or more processors such as the processor 1403 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

A computer program may comprising instruction which, when executed on at least one processor, cause the at least one processor to carry out the method as described in FIGS. 5a-13a-d. A carrier may comprise the computer program. The carrier may be one of an electronic signal, optical signal, radio signal or computer readable storage medium.

A UE 101 representative for the whole EPC control plane including at least some of the MME, SGW, PGW and PCRF functions is created with the cEPC node 205. The cEPC node 205 may have its own state machine to avoid potential raise conditions, it may communicate with existing network elements, to ensure migration and it may communicate with existing applications, to ensure future feature parity.

The embodiments herein may be implemented in a variety of different ways. In one embodiment, the whole cEPC node 205 may be implemented in one box in a native environment for example suited for VoLTE, ViLTE, SGW Data plane offload, or M2M overlay (e.g. referred to as a native solution). A in another embodiment, the payload may be conveyed in the cloud (e.g. referred to as a cloud solution). In yet another embodiment, the user plane and control plane are split so that the potentials of the combination of NFV and SDN are fully utilized (e.g. referred to as cloud and SDN solution).

With the embodiments herein, the control plane for all EPC nodes are collapsed and executed in one central instance, e.g. the cEPC node 205, which could be placed either centrally or locally. The embodiments herein may be deployed as either native or virtualized solutions. The control and user plane are separated e.g. using a SDN technology, or similar technology.

The embodiments herein are not limited to the above described embodiments. Various alternatives, modifications and equivalents may be used. Therefore, the above embodiments should not be taken as limiting the scope of the embodiments, which is defined by the appending claims.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

The term "configured to" used herein may also be referred to as "arranged to", "adapted to", "capable of" or "operative to".

It should also be emphasised that the steps of the methods defined in the appended claims may, without departing from the embodiments herein, be performed in another order than the order in which they appear in the claims.

The invention claimed is:

1. A method performed by a control plane Evolved Packet Core, cEPC, node for handling control plane signaling in a communications system, the method comprising:
    handling, at the cEPC node, all control plane signaling for a User Equipment, UE, between a Radio Access Network, RAN, node and an operator network, the handing of all control plane signaling for the UE comprising at least one of:
        handling attachment of the UE to the RAN node, the handling attachment of the UE to the RAN node including:
            receiving, from the RAN node, an attach request message for the UE, which attach request message is a request to attach to the RAN node;
            allocating an Internet Protocol, IP, address for the UE;
            preparing at least one user plane resource for the UE;
            receiving an attach complete message from the RAN node, the attach complete message indicating that attachment of the UE to the RAN node is completed; and
            updating user plane information associated with the attached UE based on the attach request;
        handling a service request for the UE;
        handling a Tracking Area Update, TAU, request for the UE; and
        handling a path switch request for the UE.

2. The method according to claim 1, further comprising:
    sending a create session request message to a Packet data network GateWay, PGW;
    receiving a create session response message from the PGW;
    sending a context setup request message to the RAN node; and
    receiving a context setup response message from the RAN node.

3. The method according to claim 1, wherein the handling the service request for the UE comprises:
    receiving, from the RAN node, a service request message for the UE;
    sending a context setup request message to the RAN node;
    receiving a context setup complete message from the RAN node; and
    updating user plane information associated with the UE based on the service request.

4. The method according to claim 1, further comprising:
    sending a credit control request message to a policy node; and
    receiving a credit control response message from the policy node.

5. The method according to claim 1, wherein the handling the TAU request for the UE comprises:
    receiving from the RAN node, a TAU request message for the UE;
    sending to the RAN node, a TAU accept message for the UE; and
    receiving from the RAN node, a TAU complete message for the UE.

6. The method according to claim 1, wherein the handling the path switch request for the UE comprises:
    receiving from the RAN node, a path switch request message for the UE;
    updating user plane information associated with the UE based on the p path switch request message;
    sending an end marker to the RAN node; and
    sending to the RAN node, a path switch acknowledgement message for the UE.

7. The method according to claim 1, wherein the service request is initiated by one of a downlink data to be transmitted to the UE and by a request for a service from the UE.

8. The method according to claim 1, further comprising:
    sending to a user plane EPC, uEPC, node, instructions related to control of user plane traffic.

9. The method according to claim 1, wherein the cEPC node is connected to a User Plane Control Function, UPCF, node configured to send instructions related to control of user plane traffic to a user plane EPC, uEPC node.

10. The method according to claim 1, wherein the cEPC node is scalable per UE.

11. The method according to claim 1, wherein the cEPC node is connected to a user plane EPC, uEPC, node through service chaining.

12. The method according to claim 11, wherein a change in the cEPC node is made without affecting the uEPC node.

13. The method according to claim 1, wherein the cEPC node is configured to perform at least two of a Mobility Management Entity, MME, function, a Serving GateWay, SGW, function and a Packet data network GateWay, PGW, function.

14. A control plane Evolved Packet Core, cEPC, node for handling control plane signaling in a communications system, the cEPC node being configured to handle all control plane signaling for a User Equipment, UE, between a Radio Access Network, RAN, node and an operator network, being configured to handle of all control plane signaling for the UE comprising being configured to at least one of:

handle attachment of the UE to the RAN node, being configured to handle attachment of the UE to the RAN node including being configured to:
  receive, from the RAN node, an attach request message for the UE, which attach request message is a request to attach to the RAN node;
  allocate an Internet Protocol, IP, address for the UE;
  prepare at least one user plane resource for the UE;
  receive an attach complete message from the RAN node, the attach complete message indicating that attachment of the UE to the RAN node is completed; and
  update user plane information associated with the attached UE based on the attach request;
handle a service request for the UE;
handle a Tracking Area Update, TAU, request for the UE; and
handle a path switch request for the UE.

15. The cEPC node according to claim 14, wherein the cEPC node is further configured to:
  send a create session request message to a Packet data network GateWay, PGW;
  receive a create session response message from the PGW;
  send a context setup request message to the RAN node; and
  receive a context setup response message from the RAN node.

16. The cEPC node according to claim 14, wherein the cEPC node is further configured to:
  receive, from the RAN node, a service request message for the UE;
  send a context setup request message to the RAN node;
  receive a context setup complete message from the RAN node; and
  update user plane information associated with the UE based on the service request.

17. The cEPC node according to claim 14, wherein the cEPC node is further configured to:
  send a credit control request message to a policy node; and
  receive a credit control response message from the policy node.

18. The cEPC node according to claim 14, wherein the cEPC node is further configured to:
  receive, from the RAN node, a TAU request message for the UE;
  send, to the RAN node, a TAU accept message for the UE; and
  receive, from the RAN node, a TAU complete message for the UE.

19. The cEPC node according to claim 14, wherein the cEPC node is further configured to:
  receive, from the RAN node, a path switch request message for the UE;
  update user plane information associated with the UE based on the path switch request message;
  send an end marker to the RAN node; and
  send, to the RAN node, a path switch acknowledgement message for the UE.

20. The cEPC node according to claim 14, wherein the service request is initiated by one of a downlink data to be transmitted to the UE and by a request for a service from the UE.

21. The cEPC node according to claim 14, wherein the cEPC node is further configured to send, to a user plane EPC, uEPC, node, instructions related to control of user plane traffic.

22. The cEPC node according to claim 14, wherein the cEPC node is connected to a User Plane Control Function, UPCF, node configured to send instructions related to control of user plane traffic to a user plane EPC, uEPC node.

23. The cEPC node according to claim 14, wherein the cEPC node is scalable per UE.

24. The cEPC node according to claim 14, wherein the cEPC node is connected to a user plane EPC, uEPC, node through service chaining.

25. The cEPC node according to claim 24, wherein a change in the cEPC node is made without affecting the uEPC, node.

26. The cEPC node according to claim 14, wherein the cEPC node is configured to perform at least two of a Mobility Management Entity, MME, function, a Serving GateWay, SGW, function and a Packet data network GateWay, PGW, function.

27. A non-transitory computer storage medium storing instructions which, when executed on at least one processor of a control plane Evolved Packet Core, cEPC, node for handling control plane signaling in a communications system, cause the at least one processor to:
  handle all control plane signaling for a User Equipment, UE, between a Radio Access Network, RAN, node and an operator network, the handing of all control plane signaling for the UE comprising at least one of:
    handling attachment of the UE to the RAN node, the handling attachment of the UE to the RAN node including:
      receiving, from the RAN node, an attach request message for the UE, which attach request message is a request to attach to the RAN node;
      allocating an Internet Protocol, IP, address for the UE;
      preparing at least one user plane resource for the UE;
      receiving an attach complete message from the RAN node, the attach complete message indicating that attachment of the UE to the RAN node is completed; and
      updating user plane information associated with the attached UE based on the attach request;
    handling a service request for the UE;
    handling a Tracking Area Update, TAU, request for the UE; and
    handling a path switch request for the UE.

* * * * *